United States Patent

Crafton et al.

[15] 3,693,155

[45] Sept. 19, 1972

[54] COMMUNICATION SYSTEM

[72] Inventors: Paul A. Crafton, Potomac, Md.; Ingmar Mittmeyer, Falls CHurch, Va.

[73] Assignee: National Telecommunications System, Inc., Oxon Hill, Md.

[22] Filed: March 23, 1971

[21] Appl. No.: 127,294

[52] U.S. Cl. ............340/147 R, 340/147 T, 340/310

[51] Int. Cl. ..............................................H04q 9/00

[58] Field of Search...340/147 R, 147 T, 147 C, 310, 340/152, 151; 179/15; 325/1, 3, 5, 6, 7, 13,15

[56] References Cited

UNITED STATES PATENTS 3,484,694 12/1969 Brothman et al. ......340/151 X 3,601,807 8/1971 Beausoleil..............340/147 C

*Primary Examiner*—Donald J. Yusko

*Attorney*—Sughrue, Rothwell, Mion, Zinn & Macpeak

[57] ABSTRACT

A communication system featuring a pyramid structured interconnecting network, adjacent levels of the interconnecting network being coupled together with single channel links. The system permits lateral signal routing once a common or linking level is reached. The base level of the pyramid structure contains message stations, with each higher level comprised of control stations. Each control station is controlled by the next higher level control station to which it is coupled while simultaneously controlling stations at the next lower level.

20 Claims, 16 Drawing Figures

COMMUNICATION SYSTEM

BACKGROUND OF THE INVENTION

The invention pertains to communication systems and more specifically to a communication system wherein each message station is connected to every other message station by means of a pyramid structured interconnection network, adjacent levels of the interconnection network being connected by means of single channel links. The communication system will be described in relation to an electric power distribution system with the single channel links taking the form of electric power lines. It will be understood by those skilled in the art that the invention is not limited to the power distribution environment and that the single channel links need not be power lines. However, an electric power distribution system is an ideal environment for the communication system of this invention since the power system provides a ready made pyramid array of linking channels which are directly accessible to users.

Basically, a power distribution system consists of a power generating plant, a series of substations and a plurality of user loads. The interconnected generating plant, substations and loads form a pyramid structured system with power running from the generating plant through the substations to the loads. Thus, at the apex of the system is the generating plant while at the base, the plurality of loads, with substations lying inbetween. The levels are interconnected by means of power transmission lines and transformers, with the voltage at each level being reduced from a maximum at the apex until it is at a proper level to service the ultimate user loads.

In some instances two or more power generating plants are interconnected by means of suitable switch gear to form a regional power distribution system. Further, it is possible to intertie regional distribution systems, again through suitable switch gear, to form a national power distribution system. Even with a national system all of the user loads, substations and power generating plants are coupled to each other by means of the power transmission lines, interrupted only by the interconnecting transformers and switch gear. Indeed, one can trace an uninterrupted path (assuming suitable by-passes are used to jump the transformers and switch gear) between any two user loads in an interconnected system. Thus, existing power transmission lines can serve as an extensive roadway for the transmission of communication signals linking many thousands of stations together.

SUMMARY OF THE INVENTION

It is the object of this invention to provide a unique system which permits two-way communication between all message stations in a communication system through the use of a pyramid structured interconnecting system using single channel links to carry data between levels of the system. When used with a power distribution system the power transmission lines provide the single channel links.

Message stations form the base level of the communication system. Along each level of the system, above the base level, there exists a plurality of control stations used to control routing of the messages. A message travels from its originating message station, upwards through the levels of the system until it reaches a level immediately below that level containing a control station common to the originating message station and the destination message station. The message is then routed downwards through the system until it reaches the destination message station.

Each control station controls the flow of data from and to the stations coupled to it at the next lower level. The lower level stations may be other control stations or message stations. By providing storage facilities at each control station, data flow between a control station and the group of lower level stations over which it is exercising a supervisory function can be made independent of the data flow between any other control station and its satellite stations. Thus, each control station, except the control station at the apex of the pyramid system, appears as a supervising control station, controlling data flow between itself and its lower level satellite stations and among its lower level stations and as a satellite station itself, transmitting data to and controlled by a next higher level control station.

Addressing of each message station is accomplished by defining it in relation to the control stations through which data must flow to reach the apex control station.

In brief, operation of the system is as follows. Each message station stores messages to be transmitted. On command, that is interrogation, from its supervising control station it transmits these messages to the supervising control station, where it is stored, if the message is destined for a message station controlled by another control station. If the message is destined for a message station under the supervision of the same control station, it passes directly to the message station without being stored in the supervising control station. Each control station, except the apex station, also stores messages received from its supervising control station. When a control station has interrogated each of its satellite stations or when its message store is full, it automatically begins transmission of stored messages, received from its supervising control station, to its satellite stations. Independent of the data flow between a supervising control station and its satellite stations, a next higher control station interrogates the supervising control station to cause it to read out messages previously received from its satellite stations. In this manner, each control station, except the apex station, acts as a supervising station as well as a satellite station. The message stations act only as satellite stations.

When used with a power distribution system by-passes are used to by-pass the interconnecting transformers and switch gear.

BRIEF DESCRIPTION OF THE DRAWINGS

FIG. 10 illustrates the in-line amplifier used in the communications system described herein;

DETAILED DESCRIPTION OF THE PREFERRED EMBODIMENTS OF THE INVENTION

The invention provides a communication system which may be used with existing power lines as data transmission paths. All message stations are interconnected by means of a pyramid structured interconnecting path. Each level of the interconnecting network except the base level of the system contains control stations with the topmost level containing a single control station. Each control station performs signal relay, routing, storing and interrogating functions. The base level contains message stations which store messages for transmission to other message stations in response to an appropriate interrogation signal.

Figure 1:
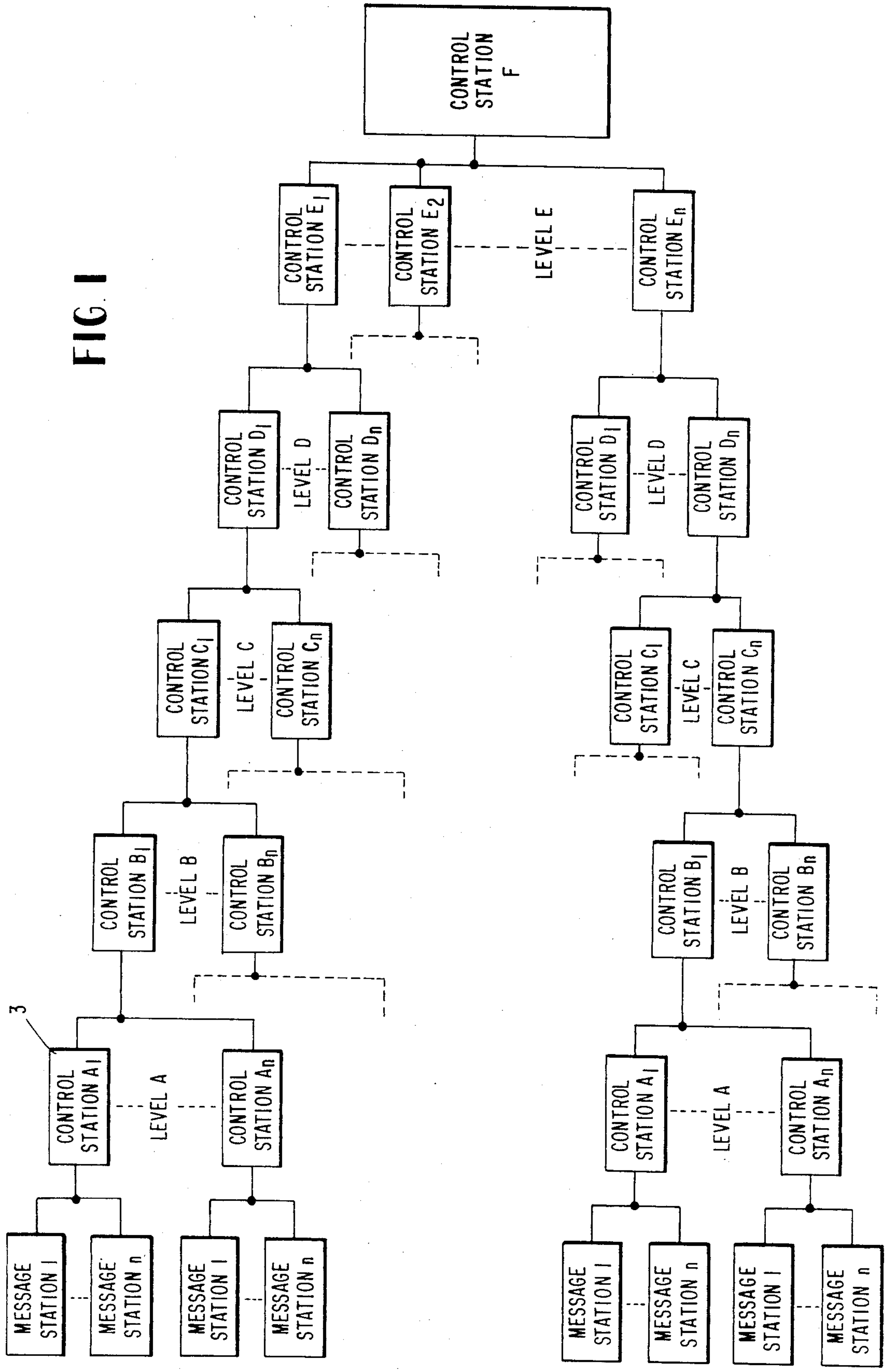
FIG. 1 is a block diagram showing the interconnecting system of this invention.

FIG. 1 illustrates the structure of the interconnecting system. Although only seven levels are illustrated, it is understood by those skilled in the art that the invention is not so limited and that the actual number of levels varies depending upon the requirements of the system.

The message stations under each control station at level A are designated by the numerals 1 . . . *n*. The control stations at level A are designated $A_1 \ldots A_n$, the control stations at level B by the letters $B_1 \ldots B_n$ etc. It should be noted that more than one control station at each level contains a common designation. This designation scheme has been selected to aid in describing the addressing scheme which will be explained in detail below. At this point it is sufficient to understand that each station is uniquely defined by the path which data, flowing from the station, take to the apex of the system. Thus, control station 3 is identified by specifying the path which data flowing out of that control station take on its way to station F. That is, station 3 is defined as the control station at address $A_1$, $B_1$, $C_1$, $D_1$, $E_1$.

When power lines are used as the single channel link between levels, each of the message stations may be located at a user load in the power distribution system. Each of the control stations would then be located at the interconnecting transformer or switch gear tying a substation to its next higher station. Each station in the power distribution system would have a corresponding control station with the hierarchy of control stations controlled by the hierarchy of the power station to which it is associated, the hierarchy of the power stations being based upon their voltage proximity to the power generating plant. Thus, level A control stations may appear at the pole transformers feeding power to the user loads with the level B control stations appearing at the power substations feeding power to the pole transformers. Level C control stations would then appear at the power substations feeding power to the level B substations, etc.

Figure 2:
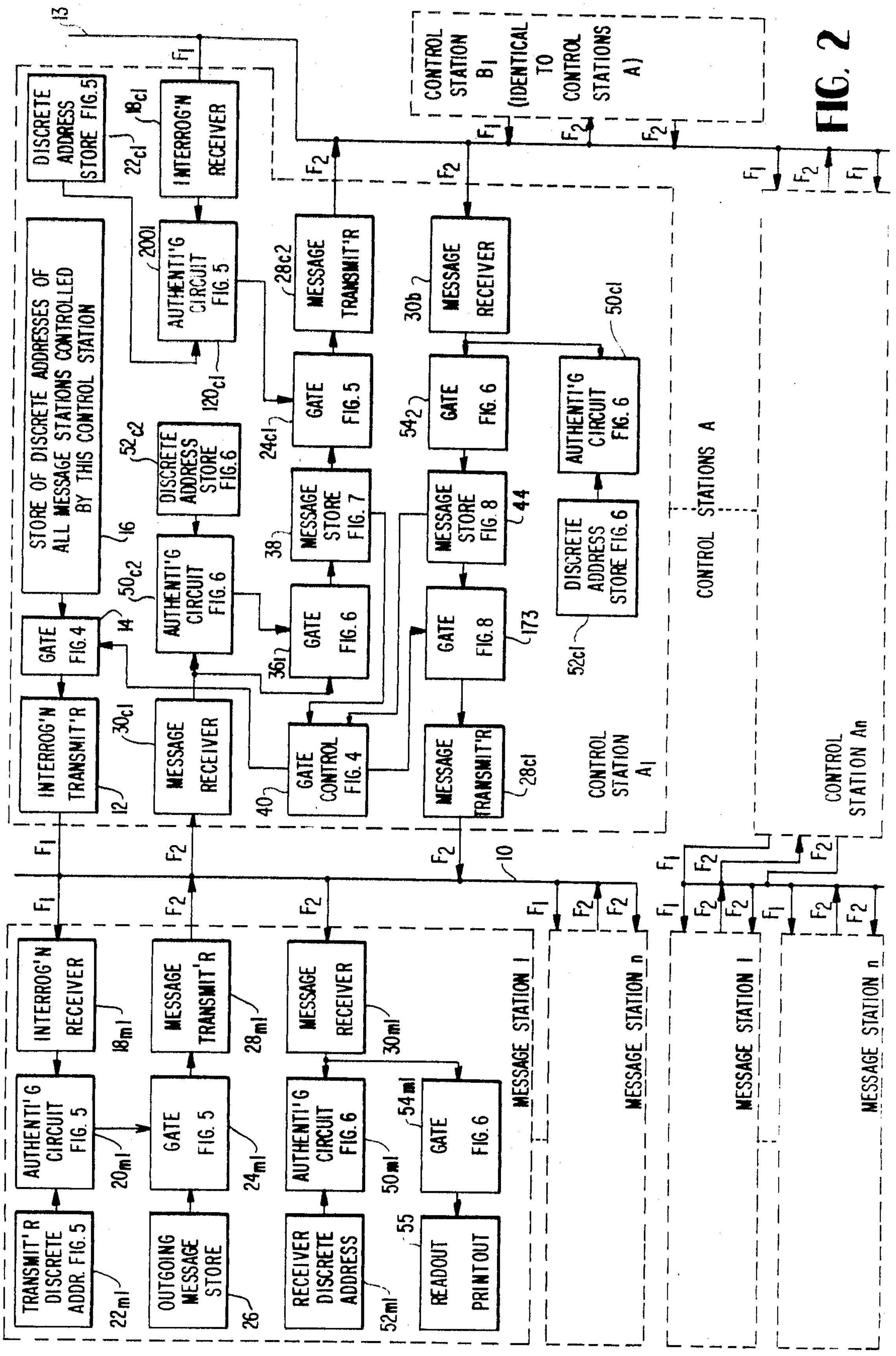
FIG. 2 illustrates in block form the contents of the control stations and message stations of this invention.

FIG. 2 illustrates illustrates, by block diagrams, the composition of message and control stations. All message stations contain the same components while all control stations contain the same components. In that the operation of the system between the message stations at the base level and the control stations at level A is repeated for all other levels within the system, the following detailed description of the invention will be given with respect to the flow of data between the message stations, the control stations at level A and the control stations at level B. It is to be understood that the description applies equally to the flow of data between all other levels.

Each control station, of which control station $A_1$ is representative, contains an interrogation transmitter 12 which transmits a series of interrogating signals to its satellite stations. In this case the satellite stations of control stations $A_1$ are message stations 1 through *n*. The interrogating signals are in the form of discrete addresses stored in store 16 of the control station.

Each satellite station, whether it be a message station or another control station, contains an interrogation receiver 18. In the message station 1 this receiver is designated by the numeral $18_{ml}$. When a message station receives a signal corresponding to its discrete address, authenticating circuit $20_{ml}$ opens gate $24_{ml}$ allowing messages stored in the outgoing message store 26 to flow to the message transmitter $28_{ml}$. Message transmitter $28_{ml}$ modulates digitally coded messages and transmits them along a single channel link 10 to message receiver $30_{cl}$ in control station $A_1$ and to message receiver $30_{ml}$ in other message stations controlled by station $A_l$. $F_2$ represents the frequencies of the transmitted message while $F_1$ represents the frequencies of the interrogation signals. Since the signals will be pulse frequency modulated, $F_1$ differs from $F_2$ to distinguish between interrogation and message signals. Message receiver $30_{cl}$ will accept a message from a message station under its control only if the message is destined for a message station under the control of another control station.

One of the advantages of this invention is that much of the same logic circuitry may be used in the control stations as well as the message stations cutting the system's cost. Blocks labelled with the same primary numerals designate the same logic circuitry with the subscript designation being used to distinguish the physical location of the circuitry within the system. Thus, the authenticating circuit $20_{ml}$ in the message station is identical to authenticating circuit $20_{cl}$ in the control stations. The circuit details of the blocks shown in FIG. 2 are described below with reference to the primary number designation only unless otherwise indicated.

Each message transmitted from a message station contains in addition to the message content the message's destination address. In a manner to be explained below, the destination address in each message is compared in authenticating circuit $50_{c2}$ with a discrete address stored in the discrete address store $52_{c2}$ to determine if the control station is to accept the message. If the message is destined for another message station under the control of the same control station, in this case control station $A_1$, authenticating circuit $50_{c2}$ initiates a signal which closes gate $36_1$ blocking the message from message store 38. However, if authenticating circuit $50_{c2}$ determines that the message is destined for a message station under the control of another control station, authenticating circuit $50_{c2}$ opens gate $36_1$ permitting the received message to flow to message store 38 where it is stored for future transmission.

After each station under the control of station $A_1$ has been interrogated or if message store 38 becomes full even if all of the message stations have not been interrogated, gate control 40 signals gate 14 to block the further transmission of interrogation signals and simultaneously opens gate 173 to allow the messages stored in store 44 to flow to transmitter $28_{cl}$. Transmitter $28_{cl}$ modulates the stored messages and transmits them over single channel link 10 to the message stations under its control.

Data flow between control station $A_1$ and its satellite stations is essentially independent of the flow of data between control station $A_1$ and its supervising control station at level B. At a time controlled solely by the activities in control station $B_i$, control station $B_i$ sends interrogating signals to its satellite control stations which includes station $A_1$. Again, it is noted that all control stations are structurally identical. Therefore, control station $B_i$ contains an interrogation transmitter 12 and an address store 16. Interrogation signals from station $B_i$ are transmitted over single channel link 13 to the interrogation receivers $18_{cl}$ in each of the A level control stations over which it has supervisory power.

The received interrogation signals are compared in authenticating circuit $20_{cl}$ with the control station 's unique address stored in the address store $22_{cl}$. In response to an appropriate interrogation signal, authenticating circuit $20_{cl}$ opens gate $24_{cl}$ causing the messages stored in store 38 to flow to the message transmitter $28_{c2}$. Message transmitter $28_{c2}$ is identical to transmitters $28_{ml}$ and $28_{cl}$. This transmitter modulates the data contained in store 38 and transmits it along single channel link 13 to all other level A control stations as well as to its supervising level B control station. After all the control stations at level A supervised by control station $B_i$ have been interrogated or after store 38 in control station $B_i$ is full, further transmission of interrogation signals is stopped and the messages stored in store 44 of station $B_i$ are applied to transmitter $28_{cl}$ of station $B_i$ to be transmitted over line 13 to its satellite control stations at level A.

Although all of the level A control stations which are supervised by station $B_i$ receive the messages transmitted from $B_i$, authenticating circuit $50_{cl}$ assures that only those messages destined for message stations over which control station $A_1$ has control will be accepted by that control station. As previously indicated, each message contains in addition to its message content its destination address. Authenticating circuit $50_{cl}$ compares the destination address in the received message with the discrete address stored in $52_{c2}$. If the message is to be accepted, that is, if the message is destined for a message station under the control of station $A_1$, gate $54_2$ is opened permitting the message to flow to message store 44. An identical operation controls the flow of data between all other levels in the pyramid structured communication system.

Before beginning a detailed discussion of the elements which comprise the control and message stations, a recommended coding system for use with this communications system will be discussed.

Figure 3:
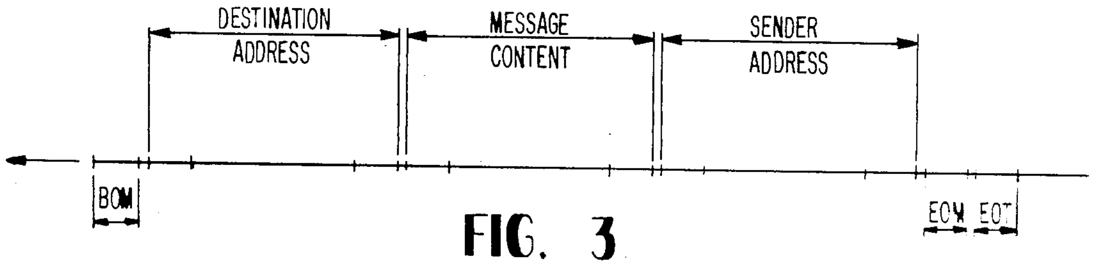
FIG. 3 illustrates the message format which may be used with the communications system of this invention.

FIG. 3 illustrates a preferred message format. The message may be viewed as being divided into six subgroups, a beginning of message (BOM) designation, the destination address, the message content, the sender address, and end-of-message designation (EOM) and an end-of-transmission designation (EOT). Coding may be in the form of binary coded alphanumeric words with the BOM signal designated by an alphanumeric 61, the EOM signal by an alphanumeric 62 and an EOT signal by an alphanumeric 63. In a manner to be described, messages are transmitted in the form of pulse frequency modulated signals. A first frequency $f_1$ may be used to identify a binary one while a second frequency $f_0$ may be used to identify the binary zero. These frequencies are designated generally in FIG. 2 as $F_2$.

Messages are transmitted serially in the direction shown. Thus, a message receiver receives in sequence the BOM signal, the purpose of which will be described below, the destination address, the message content and the sender address. The EOM signal signifies the end of a message. Since each outgoing message store 26 (FIG. 2) contains a plurality of messages, an EOT signal is used to signify the last message stored in the store.

Figure 4:
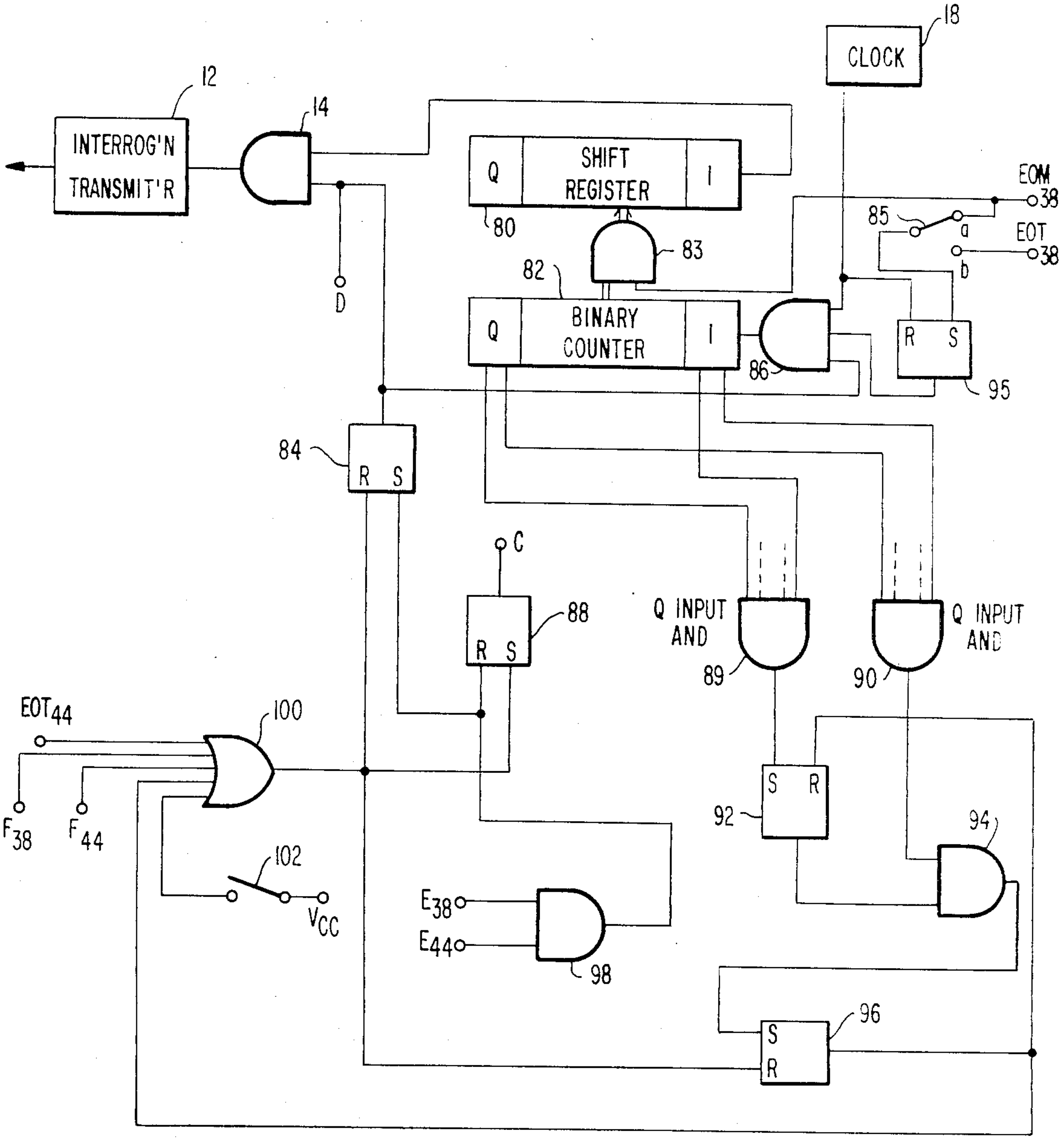
FIG. 4 shows the gate control and interrogation discrete address store of the invention.

Each of the blocks illustrated in FIG. 2 specifies the figure in which can be found details of the elemental block. FIG. 4 illustrates the details of the gate control circuit 40 and the interrogation discrete address store 16.

The interrogation discrete address store 16 is comprised of binary counter 82 and shift register 80. Binary counter 82 stores a sequence of binary numbers each representing a different discrete address identifying a different one of a group of satellite stations. Clock 88 increments the contents of counter 82 to change the address stored therein.

Let is be assumed that initially latch 84 is in a set condition and switch 85 is in contact with contact *a*. The setting of latch 84 enables AND gates 14 and 86.

Figure 7:
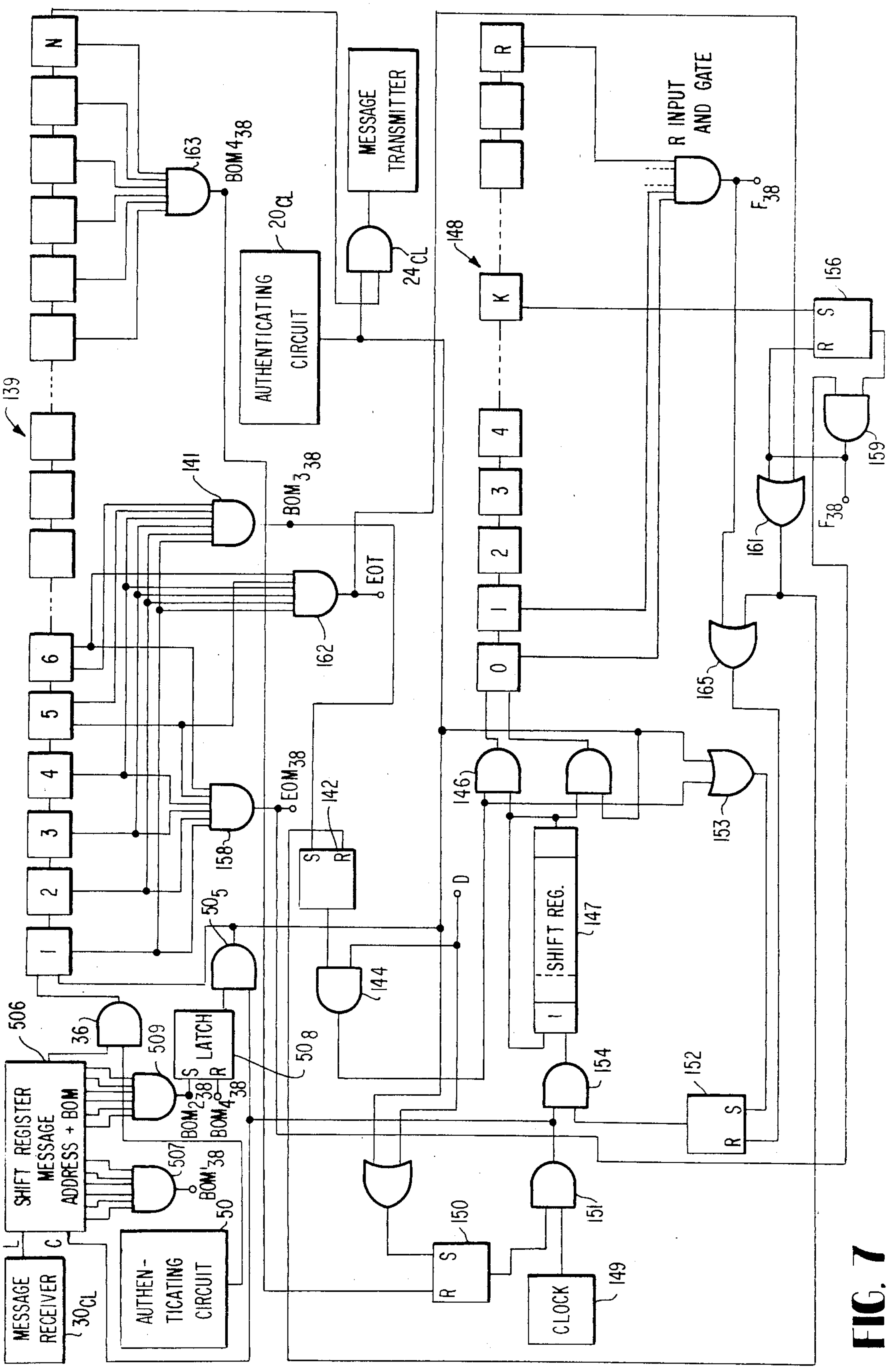
FIG. 7 illustrates one of the message stores used in the invention.

Terminals $EOM_{38}$and $EOT_{38}$are coupled to corresponding terminals in message store 38 and when raised to logic highs represent that an EOM and EOT signal respectively is in the first six stages of register 139 (FIG. 7).

As will be explained with reference to FIG. 7 each time an EOM signal is received by register 139 of a control station store 38, a pulse is produced. This pulse appears at the $EOM_{38}$terminal of the gate control circuitry which when switch 85 contacts contact *a* sets latch 95 which raises to a logic high one input to gate 86. The following clock pulse increments counter 82 thus changing the address stored therein. The pulse at terminal $EOM_{38}$ also enables gate 83 thus transfering the contents of counter 82 to register 80. This first mode of operation provides for each satellite station to be interrogated once in succession. After each station has been interrogated once the sequence can begin again by resetting the counter.

In a second mode of operation switch 85 is moved to contact *b*. In this mode, counter 82 is incremented only after all the messages in an interrogated station have been transmitted. Each EOM signal in the first six stages of register 139 enables gate 83 causing the contents of counter 82 to be transferred to register 80. Since no EOT is received the content of the counter is not incremented and thus the same station is repeatedly interrogated. However, on receiving an EOT signal counter 82 is incremented causing another station to be interrogated.

Figure 8:
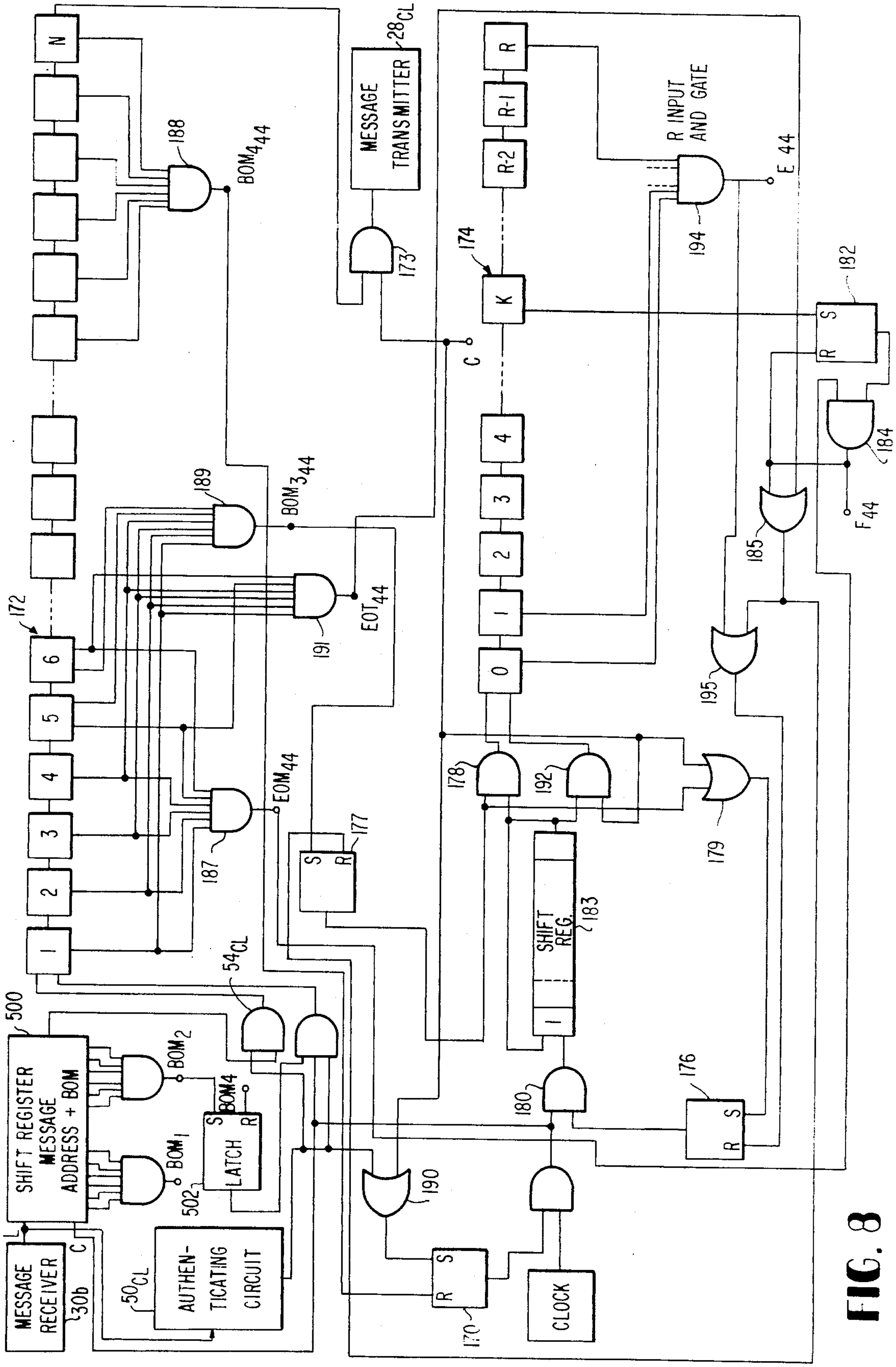
FIG. 8 illustrates a second message store used with the invention.

Shift register 80 is serially read out through gate 14 to the interrogation transmitter 12 which transmits the interrogation signal over channel 10 to the control station's satellite stations. When binary counter 82 has reached its final count, that is, when it reaches the end of its interrogation sequence, latch 92 is set through gate 89 raising one input of AND gate 94. Upon the resetting of counter 82, the output of AND gate 90 rises to a logic high thus raising to a logic high the output of gage 94 setting latch 96. The setting of latch 96 resets latch 92 and 84 and sets latch 88. The letter designation of the various terminals shown in FIG. 4 correspond to similarly designated terminals in FIGS. 7 and 8. FIGS. 7 and 8 are detailed diagrams of the message stores and their associated circuitry. Thus, output terminal C of latch 88, is connected to terminal C in FIG. 8.

Returning to the transmission of interrogation addresses by transmitter 12 over channel 10 to interrogation receiver $18_{ml}$, signals so received are applied to authenticating circuit $20_{ml}$. In addition, authenticating circuit $20_{ml}$ receives a signal indicative of the message station's discrete address contained in store $22_{ml}$.

Figure 5:
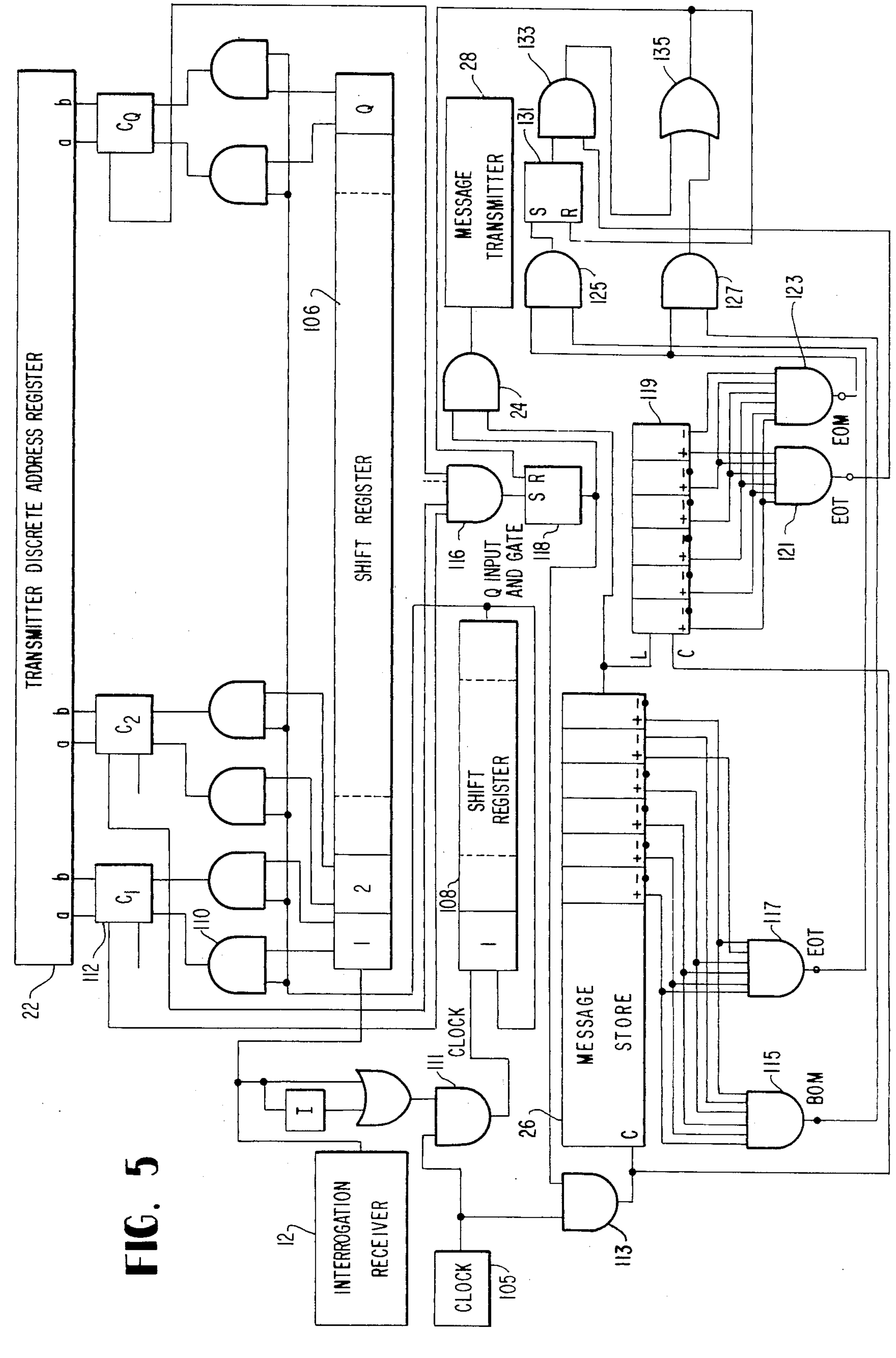
FIG. 5 illustrates one of the authenticating circuits and discrete address stores incorporated in the control and message stations.

FIG. 5 illustrates the details of the authenticating circuit 20 and store 22. The output from the interrogation receiver 18 may be viewed as a train of positive and negative pulses. These pulses are applied to shift register 106 and AND gate 111 through OR gate 109. Inverter 103 assures that each data pulse including negative pulses enables gate 111. Also included is a circulating ONE shift register 108, AND gates 110 and comparator 112, AND gate 116 and latch 118. Since each address transmitted from transmitter 12 is received by all of the stations under the control of the control station, a means must be used to distinguish between the beginning and end of an address. This is the purpose of circulating ONE register 108. A circulating ONE register is one in which prior to activation a single logic 1 appears in the first stage thereof. Each successive clock pulse shifts the logic 1 one stage until the logic 1 appears in the last stage of the register. The next succeeding pulse causes the logic 1 to circulate back to the first stage of the register. By selecting the register 108 to contain a number of stages equal to the number of bits in an address, a logic high appears at the output of register 108 only after a number of bits equal to the number in a complete address, have been stored in shift register 106. A logic high at the output of the register 108 enables gates 110 causing the contents of the shift register 106 to be transferred into the comparator 112. Comparator 112 compares the contents of register 22 which is the discrete address store with the contents of register 106. If the address stored in register 22 is the same as that stored in register 106, indicating that that station has been ordered to transmit, gate 116 is enabled setting latch 118. The setting of latch 118 enables AND gate 24 causing a message in message store 26 to flow to transmitter 28. Store 26 may take the form of any well-known storage means and may include tapes, drums or other means suitable for storing digital data.

When store 26 is a shift register the setting of latch 118 enables gate 113 causing the clock pulses from clock 105 to serially shift the contents of store 26 in the direction of gate 24.

Register 119 is a dumping register in that as the serially received bits reach the last stage they are dumped. When the EOM portion of a message is stored in register 119 the output of gate 123 enables gates 125 and 127. A second input to gate 125 is coupled to the output of gage 117 while a second input to gage 127 is coupled to the output of gage 115.

If the message just sent by transmitter 28 is not the last message stored in store 26, when register 119 stores the EOM portion of the message the last stages of register 26 contains a BOM signal thus raising to a logic high the output of gate 115. The output of gate 127 is in turn raised resetting latch 118. The purpose of this circuitry is to assure that no messages are lost if the message just sent fills the message store 38 in the supervising control station. Since latch 118 will not be set until the next interrogation signal has been verified and an interrogation signal will not be sent if store 38 is full, no messages can be lost due to the filling of store 38.

If the message being sent is the last message in the store 26 it is necessary that both the EOM and EOT signals be transmitted. When an EOM signal appears in register 119 simultaneously with an EOT signal in the last stages of store 26, latch 131 is set through gate 125. The setting of latch 131 enables gate 133. To assure that gate 24 is not blocked until after the EOT signal has been transmitted the output of gate 133 does not raise to a logic high until the EOT signal appears in register 119 causing the output of gate 121 to raise to a logic high.

The messages from store 26 are transmitted by transmitter 28 over a single channel to the control station. At the control station these messages are received by receiver 30. Each message so received is compared in authenticating circuit $50_{c2}$ with a discrete address stored in store $52_{c2}$ to determine if the message is destined for a message station under the control of another station. If it is, then gate 36 is opened, allowing the message to be stored in message store 38.

Figure 6:
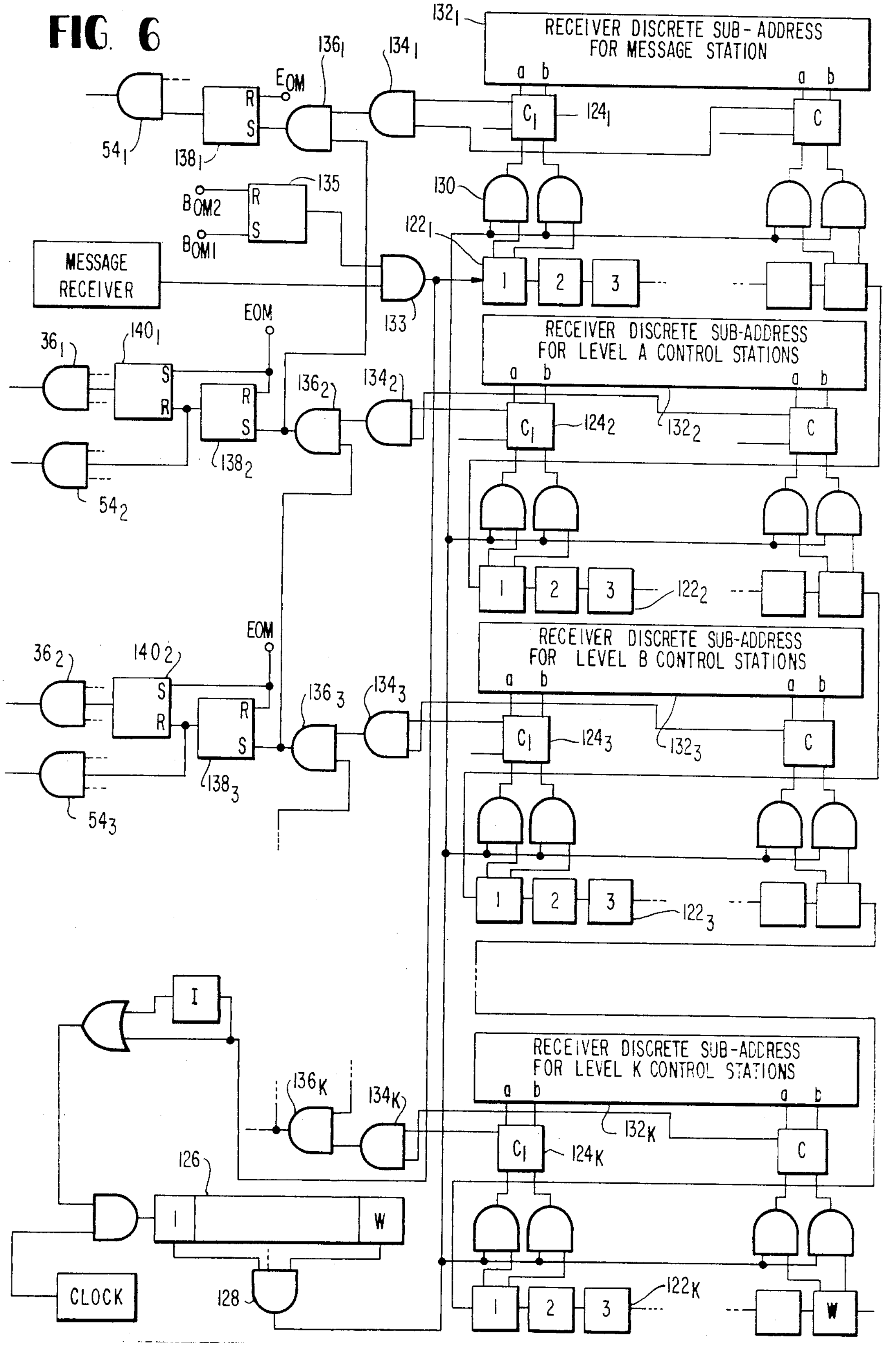
FIG. 6 illustrates a second authenticating circuit and discrete address store used in the message and control stations.

FIG. 6 illustrates the details of the authenticating circuit 50, discrete address store 52, as well as the gates 36 and 54.

Initially, operation of the circuit of FIG. 6 will be explained as it operates on receiving signals from a message receiver $30_{cl}$.

In order to understand the operation of the authenticating circuit, a description of the destination address form will first be given. The message destination address may be considered as a group of subaddresses, each subaddress corresponding to a different level of the pyramid structured communication system. The first section defines the address of a subapex control station illustrated in FIG. 1 as a level E station. Each succeeding section specifies a control station on a succeedingly lower level of the pyramid structured system, with the final section of the address containing a designation of one of the message stations. In this manner, a message station is defined by the path through which data must flow from the message station to the apex station.

The authenticating circuit contains a number of registers equal to the number of levels of the pyramid less the apex level. Thus the number of registers $132_1 \ldots 132_k$ is equal to the number of levels in the pyramid less one. These registers store the addresses of the message and control stations through which the data flowing from the control station or message station must flow in order to reach the apex station. Thus, authenticating circuit $50_{c2}$ in control station A1 would have register $132_1$ loaded with zeros and only registers $132_2 \ldots 132_k$ loaded with codes designating control station addresses.

A serial shift register 122 is coupled through gate 133 to the output of the message receiver 30. Register 122 may be comprised of a group of $k$ serially connected registers $122_1 \ldots 122_k$. Also coupled to the output of the message receiver is a binary counter whose maximum count equals the maximum number of bits in a destination address.

When the BOM signal in a message is received at the control station it is stored in a register which can be considered part of store 38. This register is denoted 506 in FIG. 7. Register 506 also stores the remainder of destination address contained in the incoming message. However, as soon as the BOM signal appears in the first six stages of the register the output of gate 507 raises to a logic high. The output terminal of gate 507 is labeled BOM $1_{38}$ and is coupled to the similarly labeled terminal in FIG. 6. Thus a logic high on terminal BOM $1_{38}$ sets latch 135 enabling gate 133 permitting the destination address to enter the authenticating circuit. Since the BOM signal and address must be saved in case the message is to be accepted and stored in register 139 they are initially stored in register 506. The operation of register 506 in relation to store 38 is explained below.

Returning to FIG. 6, each received address bit increments counter 126. When the counter is full, the output of AND gate 128 raises to a logic high signifying that a complete address is stored in the authenticating circuit. A logic high at the output of gate 128 enables AND gates 130 causing the contents of register 122 to be fed to comparator 124. Comparator 124 compares the received message address with the stored discrete address to determine correspondence.

It will be remembered that gate 36, will be enabled only if the received messages are destined for a message station under the supervision of another control station at level A. Thus, a message sent from message station 1 supervised by control station $A_1$, if directed to a message station under the control of the same station $A_1$, would contain a destination address whose subaddresses, except for the portion of the subaddress pertaining to the message station itself, is identical to the discrete stored address in address store $52_{c2}$ which is equivalent to register $132_1 \ldots 132_k$.

Comparator 124 may be viewed as being divided into a series of comparator elements $124_1 \ldots 124_k$ each element corresponding to a subaddress. The output from the comparator element $124_1$ is coupled to AND gate $134_1$. Similarly the outputs of each of the comparator elements $124_2 \ldots 124_k$ are coupled to corresponding AND gates $132_2 \ldots 134_k$. If the message transmitted from a message station is destined for a message station under the control of the same control station then the outputs of gates $134_2 \ldots 134_k$ are all at logic highs. The output of gate $134_1$ would be at a logic low but in this instance the state of gate $134_1$ is immaterial. Gate $134_1$ is at a logic low because at level A register 132 is loaded with zero. Gates $136_2 \ldots 136_k$ are therefore enabled setting latches $138_2 \ldots 138_k$ which causes latches $140_1 \ldots 140_{k-1}$ to be reset.

FIG. 6 illustrates a number of gates $36_1 \ldots 36_k$ and $54_2 \ldots 54_k$. Only one of these gates will have its output further connected to additional circuitry in any station. The particular gate further connected depends on the level of the station in the pyramid structure and its location within the station. For example, when the authenticating circuit appears as a circuit $50_{c2}$ in a control station, one of the gates 36 will have its output coupled to a message store 38. The particular gate to have its output further connected depends on the level location of the station in which it is found. Thus for an authenticating circuit $50_{c2}$ in a control station at level A the output of gate $36_1$ is coupled to store 38. Similarly, if circuit $50_{c2}$ is located in a level B station the output of gate $36_2$ is coupled to the store 38 in the control station.

When the authenticating circuit appears as circuit $50_{cl}$ then one of the gates 54 has its output coupled to a message store 44. Again, the particular gate further coupled depends on the level location of the station in which it is contained. If the authenticating circuit in FIG. 6 is contained in a message station, that is if it appears as a circuit $50_{ml}$ then $54_1$ is connected to the read-out circuitry 55.

When the circuitry of FIG. 6 is used in a B level control station as the authenticating circuit $50_{c2}$, registers $132_1$ and $132_2$ would be loaded with zeros. A message directed to flow through an A level control station to another A level control station supervised by the same B level control station causes gates $134_3 \ldots 134_k$ to be enabled causing latch $138_3$ to be set, resetting latch $140_2$, disabling gate $36_2$. The zero content in register $132_2$ enables gate $134_2$ which in turn causes the output of gate $136_2$ to be at a logic low, causing latch $138_2$ to remain in a reset state. At this point it should be noted that each latch $138_1 \ldots 138_k$ is reset after each message by the EOM signal in the message. The EOM signal will also set latches $140_1 \ldots 140_{k-1}$. With latch $138_2$ in its reset condition, latch $140_1$ will be set enabling gate $36_1$. However, since in the B level control stations the output of gate $36_1$ is not connected, the enabling of this gate does not cause erroneous operation of the system.

Let it now be assumed that a message from message station 1 under the control of control station $A_1$ is destined for a message station under the control of another control station. Under these conditions at least one of the gates $134_2 \ldots 134_k$ will be disabled. If any of the gates $134_2 \ldots 134_k$ is disabled, gate $136_2$ will be disabled causing latch $138_2$ to remain reset and latch $140_1$ set. This enables gate $36_1$ to allow the received message to pass through message receiver 30 to message store 38. Latch $140_1$ remains set until an end of message signal is received, at which time it is reset, disabling gate $36_1$. Register 126 begins counting again on the receiving of the next BOM signal at the start of the next message.

FIG. 7 illustrates message store 38. When a gate 36 is enabled in a manner previously described, the BOM and message destination address in register 506 enters the N bit shift register 139. This is accomplished by coupling the output from gate 509 to latch 508. The BOM signal in the last six stages sets the latch allowing the clock pulses to increment register 139 through gate 505. The presence of a BOM signal in the first six stages of register 139 raises to a logic high the output of gate 141, setting latch 142 which enables AND gate 144. The other input to gate 144 is coupled to terminal D. Terminal D corresponds to the similarly labeled terminal in the gate control circuit of FIG. 4. Terminal D is raised to a logic high when latch 84 is set. Thus with latches 84 and 142 set, the output of gate 144 is at a logic high enabling gate 146. The second input to gate 146 is coupled to the last stage of a six-bit circulating ONE shift register. The output of gate 146 is coupled to an up-down counter 148. The purpose of counter 148 is to count the number of characters stored in register 139. When register 1389 is full, as indicated by a suitable output from register 148, further interrogation of the control station's satellite stations is stopped. In a manner to be described, an output from register 148, indicating the full status of register 139, causes gate 173 to be enabled permitting the transmission of messages from message store 44 to the satellite stations.

A full count in counter 139 will be defined as a count corresponding to a number of characters K which is less than R the total character capacity of the register 139.

Each six-bit character received in register 139 causes the output of register 147 to raise to a logic high thus raising the output gate 146 to increment register 148. Incrementing of register 147 is caused by clock pulses from clock 149. Clock pulses from source 149 are permitted to pass through gate 151 only if latch 150 is set. Latch 150 is set in response to a logic high at terminal D. A logic high at terminal D indicates that the control station is acting in an interrogation mode.

The receipt of the BOM signal, in addition to enabling gate 146, also sets latch 152 through OR gate 153. The setting of latch 152 enables gate 154 permitting the clock pulses to shift the contents of register 147. Each six-bit character received in register 139 causes the contents of register 148 to be incremented. When K characters are stored as indicated by a logic 1 in the Kth stage of register 148, latch 156 is set. However, it is possible and quite probable that at the time when K characters have been stored in register 139 a portion of an incoming message may not have yet reached the register 139. Since it is necessary to store complete messages only the reaching of a full count should not automatically block further information bits from entering register 139. To accomplish this, the incoming signal is allowed to continue to enter register 139 until an end of message (EOM) signal is received. Receipt of the EOM signal raises to a logic high the $EOM_{38}$ output of gate 158, enabling gate 159, causing a logic high to appear at terminal $F_{38}$. Terminal $F_{38}$ in FIG. 8 corresponds to terminal $F_{38}$ in FIG 4. Thus the logic high at terminal $F_{38}$ causes latch 88 to be set.

With latch 88 set, a logic high appears at terminal C. Terminal C is coupled to the corresponding terminal in message store 44, illustrated in FIG. 8. A logic high at terminal C will, in a manner to be described, permit the information stored therein to be read out to the control station's satellite stations.

Returning to FIG. 7, a logic high at the output of gate 159 resets latch 152 blocking the further incrementing of register 147. In addition, the existence of a logic high at terminal $F_{38}$ causes latch 142 to be reset. It is also noted that the existence of a logic high at $F_{38}$ in addition to setting latch 88, resets latch 84, blocking the further transmission of interrogation signals.

It should be noted that even with the register 139 at a full state, latch 150 remains set to permit clock pulses to continue clocking register 139 to move the contents therein to the end stages. When the first BOM signal reaches the last six stages, the output of gate 163 is raised to a logic high causing latches 508 and 150 to reset.

When an end of transmission signal (EOT) is received in the first six stages of register 139, gate 162 is enabled, which resets latch 152 through gates 161 and 165 and latch 142 through gate 161. This blocks the further incrementing of register 148. However, it is noted that latches 150, and 508 remain set, allowing the contents already in register 139 to continue to be incremented through the register.

When the last message station or satellite control station, as the case may be, has been interrogated, latch 84 resets and latch 88 sets through gate 100 (FIG. 4). Resetting of latch 84 causes terminal D to attain a logic low.

The operation of message store 44 will now be described. This message store receives messages from a higher level control station and stores it for subsequent transmission to a lower level station. The following discussion will make reference to FIGS. 4 and 8, FIG. 8 showing the details of the message store 44.

When a supervising control station such as station $B_i$ transmits messages to its satellite stations each message is simultaneously received by all satellite stations under station $B_i$ control. The destination address portion is compared in authenticating circuit $50_{c1}$ with a stored address in store $52_{c1}$. If the satellite station is to accept the message as indicated by the setting of the appropriate latch $138_1 \ldots 138_k$, latch 170 is set through gate 190. Operation of store 44 during the authenticating segment of operation is identical to the operation of store 38 during this same interval.

Loading of message store 44 follows closely the loading of message store 38. In addition to the message storing shift register 172, store 44 contains an inventory register 174 which keeps track of the number of characters stored in register 172. Associated with register 174 is circulating ONE shift register 183 containing six stages. In the manner previously described with respect to store 38, when the first BOM character is received, latch 177 is set through gate 189 enabling gate 178. The setting of latch 177 also sets latch 176 through gate 179. The setting of latch 176 permits gate 180 to pass clock pulses to the shift register 183.

In this manner, after each character has been stored in register 172, register 174 is shifted one unit. Register 172 is considered full when it contains K characters where K is less than R, R being equal to N/6, N being the number of stages in register 172. Loading of register 172 continues in the manner previously described with respect to store 38. When K characters are stored in the storage means, latch 182 is set, enabling gate 184. In that only part of a complete message may be stored in register 172 at the time K characters are stored therein, register 172 is allowed to continue to accept characters until an end of message (EOM) signal is received. The EOM signal is detected by gate 187. When an EOM character is stored in the first six stages of register 172, the output of gate 187 is raised to a logic high, raising to a logic high terminal $F_{44}$. A logic high at $F_{44}$ resets latches 84, 176, 177, 182 and sets latch 88. It should be noted that latches 170 and 502 remain set. Thus clock pulses continue to be applied to register 172 causing the contents thereof to continue to shift to the last stages thereof. The logic high at terminal $F_{44}$ causes the gate control means in the station containing the full store 44 to switch to a transmit mode of operation opening gate 173. With gate 173 open, messages in store 173 flow to transmitter $\mathbf{28}_{c1}$ where they are sent to the lower level stations coupled to the control station.

The first character which is received in the last six stages of register 172 is the BOM character which was initially received in the first six stages. A BOM signal in the last six stages raises the output of AND gate 188. The output of gate 188 is coupled to the reset side of latch 170 thereby resetting this latch when the BOM signal appears in the last six stages of register 172. With latch 170 reset the clock pulses are blocked from register 172.

The method of reading out store 44 will now be described. With gate 173 being enabled by a logic high at terminal C, as the BOM character reaches the last six stages of register 172, they continue to flow out of the register through gate 173 to message transmitter $\mathbf{28}_{c1}$.

With a logic high at terminal C latch 170 is set through OR gate 190 and AND gate 192 is enabled. The output of gate 192 is coupled to the downshift input of register 174 such that each pulse at the down shift input causes the registers to decrement. Thus, each 6 bit character read out of register 172 causes shift register 174 to decrement one count. When register 174 is empty, as signified by a logic high at the output of gate 194, latch 176 is reset. In addition, latch 88 is reset and latch 84 set placing the control station in an interrogation mode once again.

Reading out from message store 38 follows an identical procedure as that disclosed for store 44 except that gate $\mathbf{24}_{c1}$ is enabled by authenticating circuit $\mathbf{20}_{c1}$.

As previously indicated, when the communication system of this invention is utilized with a power line transmission system, the power line providing the single channel link between levels of the pyramid array, a means must be provided to bypass the transformers and switch gear.

As will be described in detail under the description of the receivers and transmitters for use with this invention, each transmitter transmits carrier signals at two frequencies, the carrier at a first frequency designating a logic 1 while the carrier at a second frequency is designating a logic 0.

In the following discussion the carrier frequencies used by the interrogation transmitter are designated generally as $F_1$ and comprise frequencies $f_1$ and $f_2$. Messages are transmitted at frequencies denoted generally $F_2$ and comprise carrier frequencies $f_3$ and $f_4$.

The carriers are modulated by a 60-cycle waveform or by a waveform at a frequency equal to an integral multiple of the power line frequency. The modulated carriers are serially transmitted via a single channel communication link which in this case would be a power line.

Figure 9:
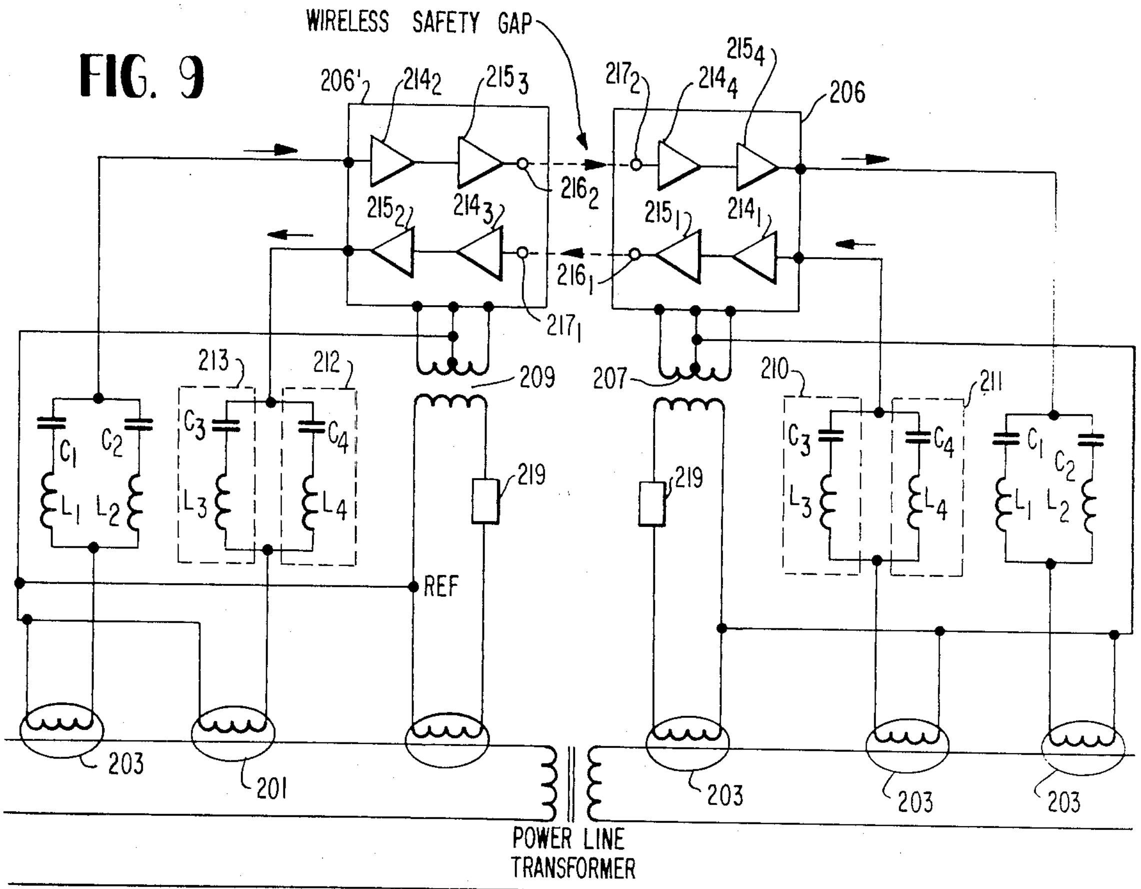
FIG. 9 illustrates the power line transformer amplifier-bypass.
Figure 1C:
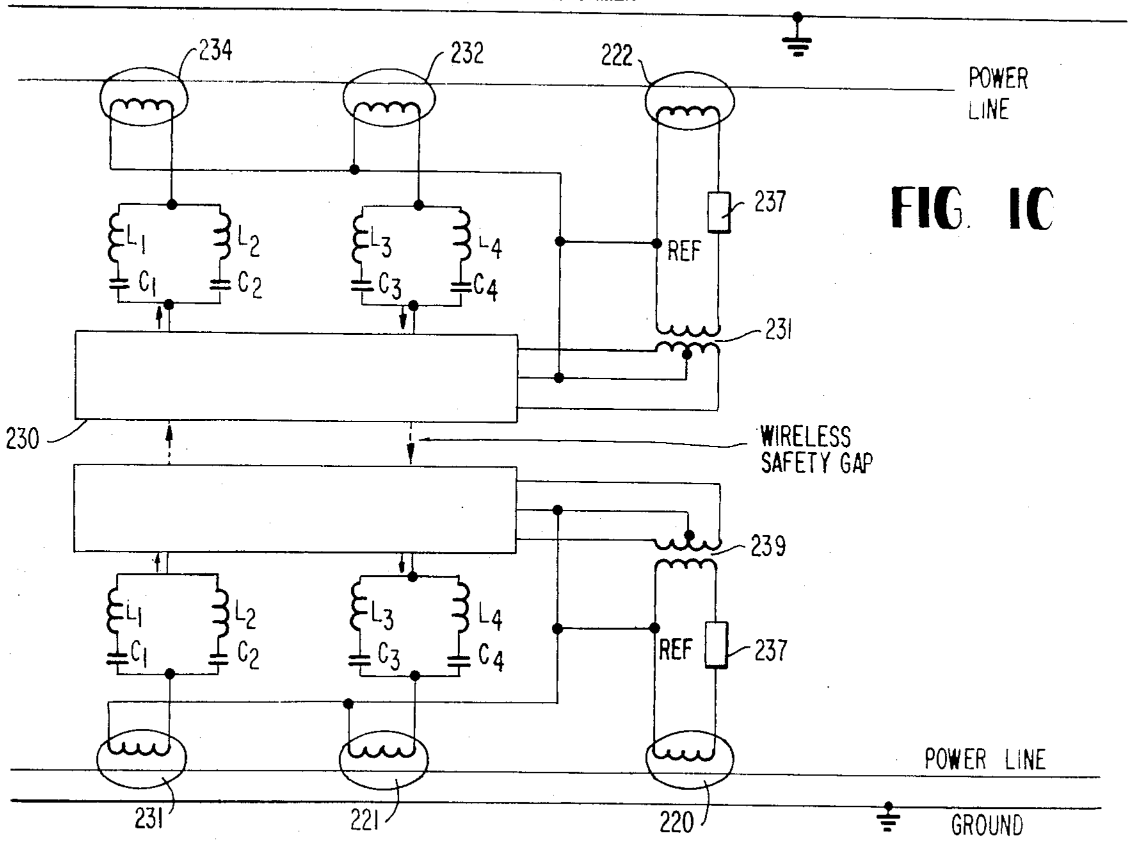

When the communication signal reaches a power line transformer, a by-pass means as illustrated in FIG. 9 is provided to cause the signal to bypass the transformer. Since the power lines can not be physically cut when connecting the bypass to the lines, current transformers 203 are used to couple the power line to the by-pass.

To provide lightning protection each side of the by-pass is coupled to a local reference. The local reference is preferably a center tap on input transformers of the transceivers. When a lightning surge occurs the signal rides on the surge thus protecting the filter networks 210–213, the LC tuned circuit and the transceiver components.

Current regulators 219 limit the current to transformers 207 and 209 which function as the power supplies to the transceivers 206 and 206'. When a message is to cross a by-pass, from for example the right side of the power line transformer, the 60-cycle power from the power line is transferred via transformer 207 to transceiver 206 which forms a part of the wireless link. Transceiver 206 may contain any known optical, acoustic, or radio wave transceiver.

The tuned circuit comprising the capacitor-inductance combination $L_3$, $C_3$ is series tuned to data frequency $f_3$ while the tuned circuit comprising capacitor $C_4$ and inductor $L_4$ detects data signals at frequency $f_4$. Transceiver 206' is identical to transceiver 206. Information transmitted from transceiver 206 is received at transceiver 206' and selectively passed by the filters 212 and 213 through the current transformers 203 to the power line.

As a specific example, consider a message signal at frequencies $f_3$ and $f_4$ traveling along the power line coupled to transformers 203. LC circuits 210 and 211 pass the data signals at frequencies $f_3$ and $f_4$ respectively through the transceiver 206 to the transceiver 206', through filters 212 and 213 to transformer 201 and thus to the power line.

In addition to operating as a wireless by-pass, the circuitry illustrated in FIG. 9 operates as a signal amplifier. When a communication signal is received by transceiver 206 it is initially received by sense amplifier $\mathbf{214}_1$. Sense amplifier $\mathbf{214}_1$ senses the received signal, amplifies it and applies it to driver amplifier $\mathbf{215}_1$ where the signal is again amplified. The output of driver amplifier $\mathbf{215}_1$ is supplied to the element $\mathbf{216}_1$. When an optical transceiver is used, element $\mathbf{216}_1$ may take the form of a lamp and receiver element $217_1$ in transceiver 206', a light responsive pick-up such as a photodiode or phototransistor. The output of the receiving link element is applied through a sense amplifier and an output amplifier to the filters 212 and 213. Element $216_2$ is identical to element $216_1$ and element $217_2$ is identical to element $217_1$.

The above-described signal amplifier-bypass is coupled across each of the power line transformers and switches. They are sufficient to compensate for the high attenuation in the power lines if the distance between control stations is relatively small. However, for long lines which do not contain transformer amplifier-bypasses at regular intervals, there must be provided in-line booster-amplifiers which do not require the actual cutting of the power line for installation.

Figure 11A:
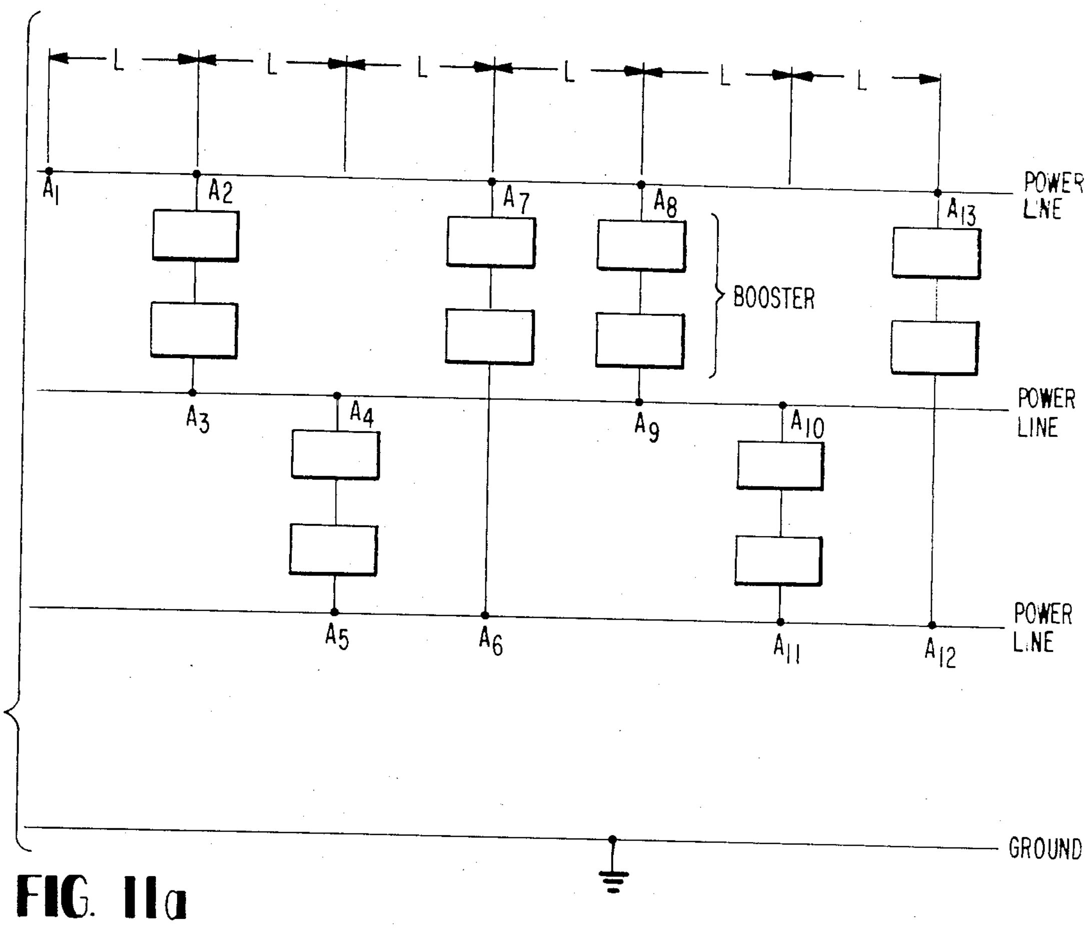
FIG. 11*a* illustrates the connection of the in-line amplifier in conjunction with a three phase power line system.
Figure 11B:
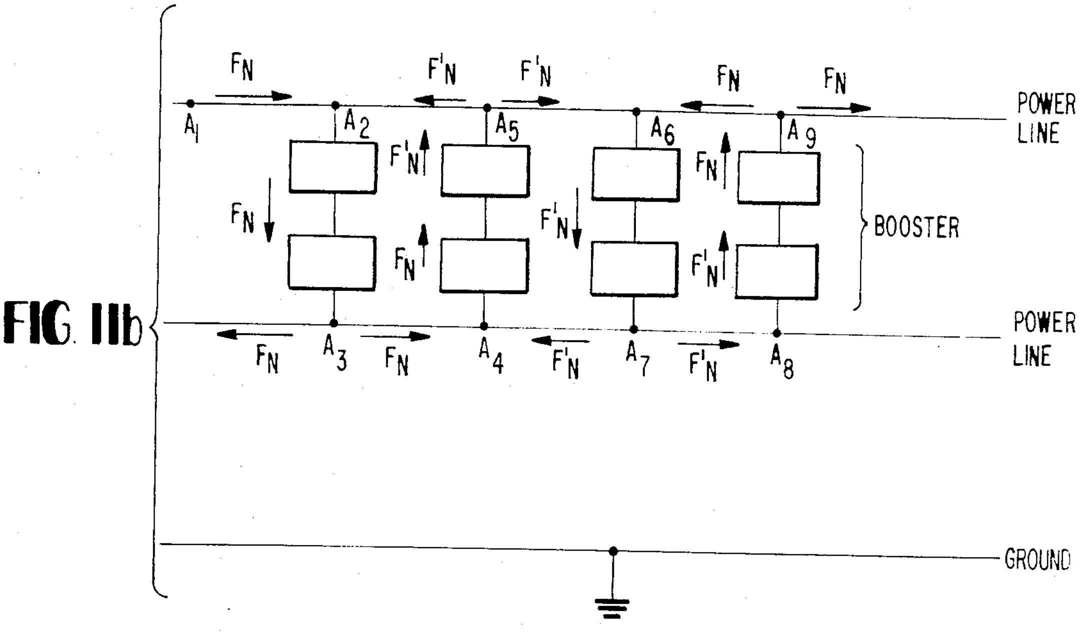
FIG. 11*b* illustrates the connection of the in-line amplifiers in connection with a single-phase transmission system.

FIGS. 11*a* and 11*b* illustrate a technique for connecting in-line boosters to the power lines. FIG. 11*a* represents the connecting scheme in a three phase system while FIG. 11*b* represents the connecting scheme in a single phase system. In the case of a three phase power transmission system, a booster pickup a signal on one phase line, amplifies it and places it on another phase line. If boosting is required every distance L, it can be assumed that the signal is lost at a distance 2L from the previous boosting location. Thus, with reference to FIG. 11*a*, the signal at point $A_2$ is detected by the booster and transmitted to point $A_3$ on a second power line. The signal continues to travel down the second power line a distance L where at point $A_4$ it is transferred via the booster to a third power line at point $A_5$. Again the signal travels for a distance L where at point $A_6$ the signal is detected by the booster and transmitted to point $A_7$ on the first power line. The boosters are connected to cyclically move the signals from phase wire to phase wire to prevent "ring around."

Let it be assumed that the booster between points $A_4$ and $A_5$ instead of being returned to the third power line was returned to the first power line. Let it further be assumed that the output signal from a booster is not almost completely attenuated over a distance L. In such a case, if point $A_5$ was situated on the first power line, the signals emanating from the booster which travels in both directions on the power line would be seen at point $A_2$. Thus, the booster between points $A_2$ and $A_3$ would amplify this "ring around" signal and again transmit it down the second power line. The "ring around" signal interferes with the information signal being transmitted over the power line which as an end result causes the receiver to receive an erroneous information signal.

FIG. 11*b* illustrates the connection scheme for boosters in a single phase system. It is obvious that since only two wires are used, cyclic interconnection of the boosters as illustrated in FIG. 11*a* is impossible. Therefore, some other means must be devised in order to eliminate the "ring around" problem. In FIG. 11*b* the notation $F_N$ denotes a pair of data frequencies $f_i, f_j$. $F'_N$ denotes a pair of data frequencies $f'_i, f'_j$. At location $A_2$, the signal is applied to a booster and sent to point $A_3$ on a second power line. At $A_4$, frequency pair $F_N$ is applied to a booster. This booster has the capability of changing the frequency of the received data signals so that the output is at frequencies $F'_N$. Therefore point $A_5$ sees data signals at frequencies $F'_N$ rather than $F_N$. At $A_6$, the signal is applied to a booster which has an output at frequencies $F'_N$. At the booster across $A_8$ and $A_9$ the signal frequencies are transformed back to $F_N$.

The purpose of the frequency change is to prevent "ring around." Since the booster input at $A_2$ will not accept signals at frequencies $f'_i, f'_j$, no "ring around" is caused by the signals at $A_5$. Similarly, since $A_4$ will not accept $f'_i, f'_j$ and $A_8$ will not accept signals of frequencies $f_i, f_j$, "ring around" is eliminated all the way down the line.

FIG. 10 illustrates the details of an in-line signal booster. Transformers 221, 231, 232 and 234 provide clamp on means for tapping signals off the power lines, and transformers 220 and 222 provide clamp on means for tapping power off the power lines. As with the transformer bypass-amplifier, the circuitry is coupled to a local reference to protect the booster circuitry from lightning surges along the power line. Communication link 230 may be identical to transceivers 206 and 206' illustrated in FIG. 9. Current regulators 237 provide current to the transformer 239 which are coupled as power supplies to the transceivers.

When the booster repeater illustrated in FIG. 11 is used with a single phase transmission system, communication link 230 would contain the frequency converters. Such converters are known in the art and further description thereof is not necessary for a full understanding of this invention.

A description of a transmitter and receiver which may be used with the communication system described herein follows. In that the interrogation and message transmitters as well as the interrogation and message receivers are of the same construction, the transmitter and receiver described herein may be used for interrogation or message transmission.

Figure 12:
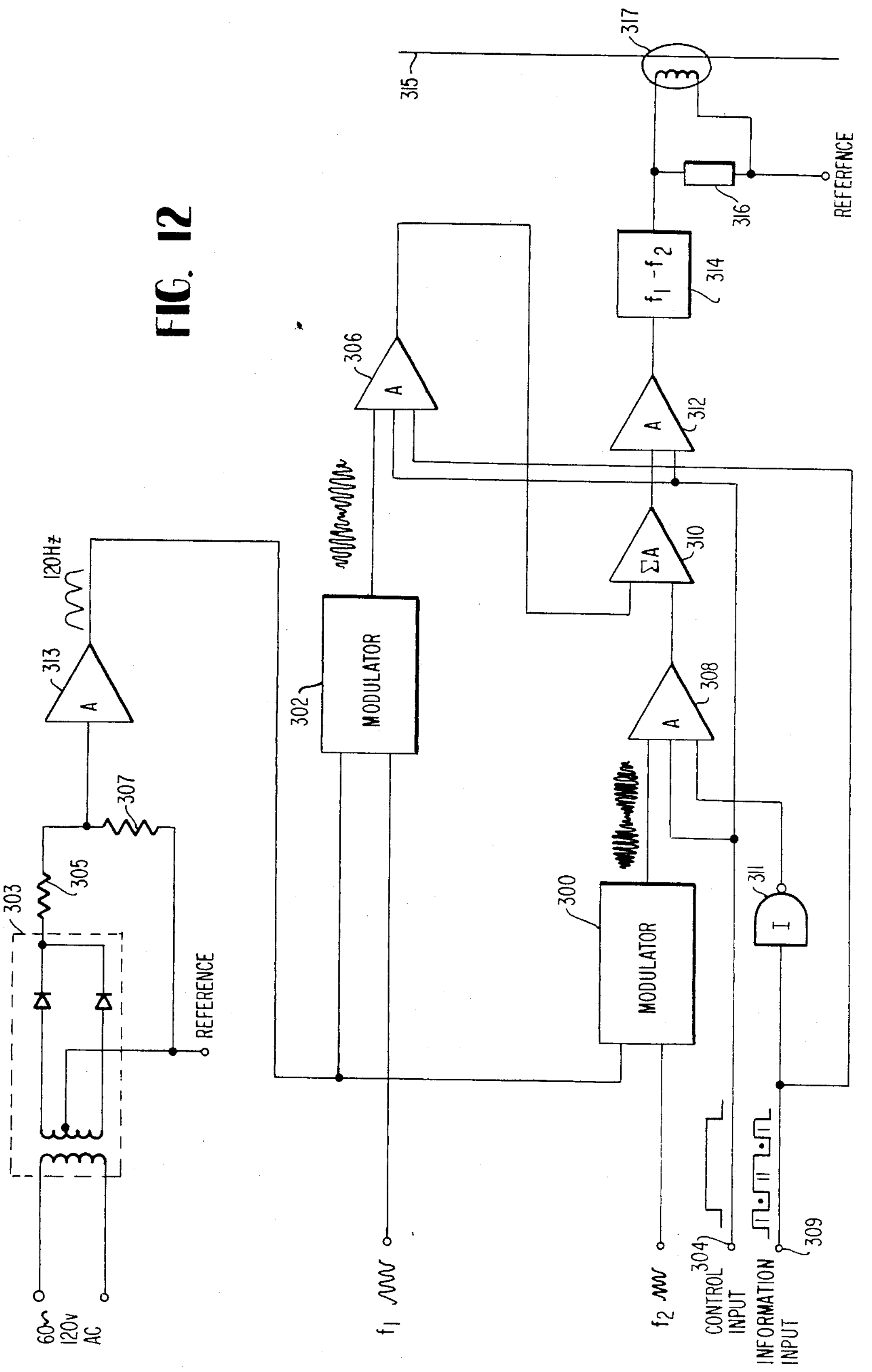
FIG. 12 illustrates a transmitter which may be used with the communications system of the invention.

FIG. 12 illustrates the transmitter. Let it be assumed that it is operating as an interrogation transmitter, therefore carrier frequencies $f_1$ and $f_2$ are used. These carriers are modulated by a 120 hertz modulating signal in modulators 300 and 302 respectively. The 120 hertz modulation signal is produced by full wave rectification of a suitable AC voltage (rectifier circuit 303) furnishing the proper input signal (voltage divider comprising resistors 305, 307) to amplifier 313.

Amplifiers 306 and 308 are gating amplifiers passing the modulated signals from modulators 300 and 302 in response to information signals whenever the control input 304 is at a logic ONE. A logic 1 appearing at information input terminal 309 together with a logic 1 at input 304 enables amplifier 306 but disables amplifier 308 since the output of inverter 311 is low. Enabling amplifier 306 passes the modulated $f_1$ carrier through summing amplifier 310, power amplifier 312 and bandpass filter 314 to the transmission line 315. A logic 0 data signal disables gating amplifier 306 while enabling gating amplifier 308 by means of inverter 311. Enabling gating amplifier 308 causes the modulated carrier at frequency $f_2$ to pass through summing amplifier 310, power amplifier 312 and bandpass filter 314 to the transmission line 315. In this manner, digital information signals are pulse frequency modulated for transmission over suitable transmission lines. The peak output swing of the signal from amplifier 312 should be selected to give an optimal signal to noise ratio at minimum power required to drive into the line coupled load.

When the communication system is used in the power distribution system environment, the transmitter includes one or more coupling transformers 317, tuned to either a single frequency or a band of frequencies by tuning network 316.

Figure 13:
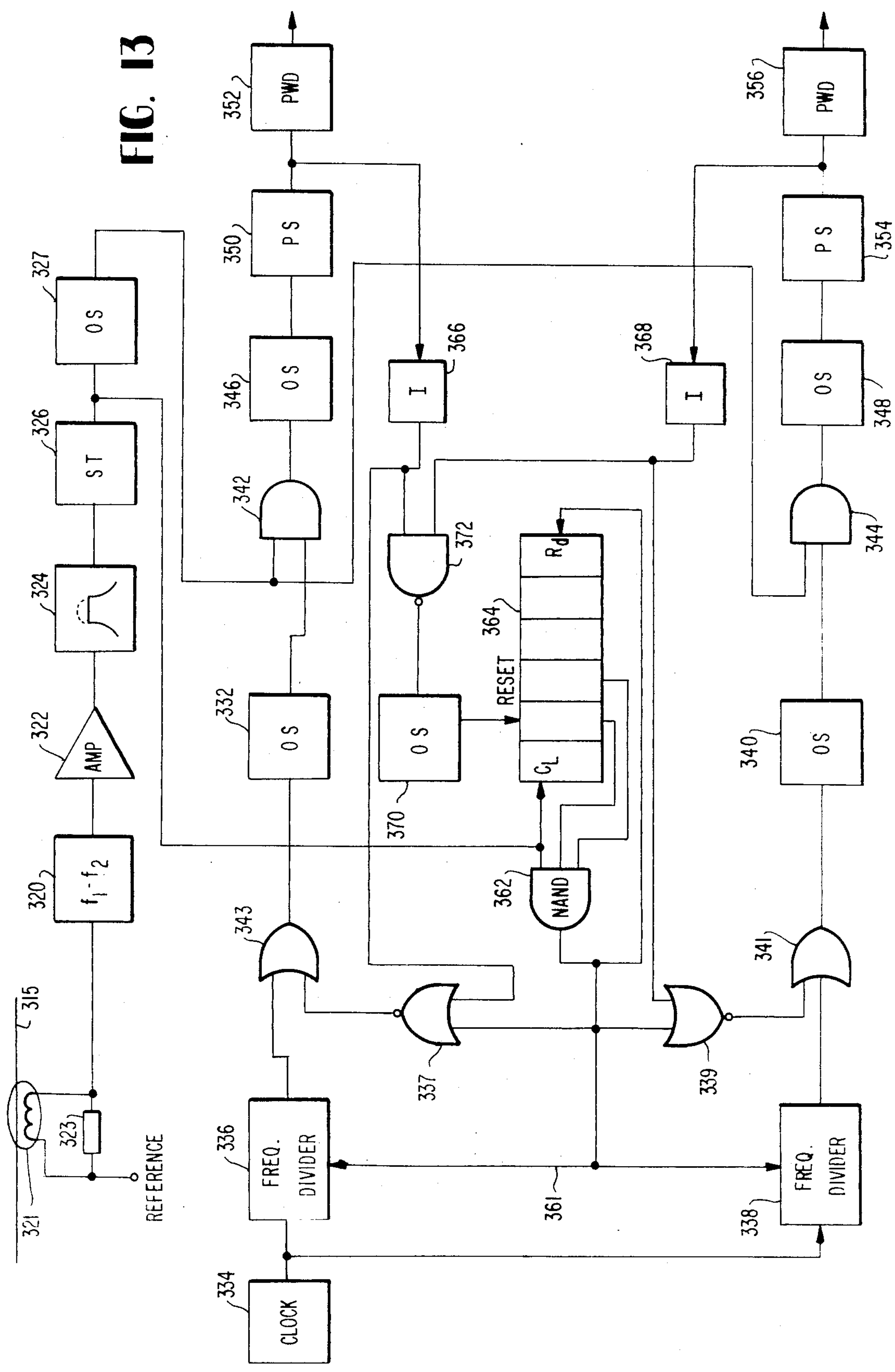
FIG. 13 illustrates one embodiment of the receiver for use with this invention.

In one embodiment of this invention the receiver determines the unknown frequency of an incoming signal by comparing its period to a locally generated reference period. FIG. 13 shows the basic diagram for this receiver. Major functional components are the input pulse shaping circuits, the Reference Signal Generator, Coincidence Circuitry, a resynchronizing circuit, and an output pulse width discriminating circuit. The input pulse shaping circuits are the bandpass filter 320, the amplifier 322, clipper 324, and Schmitt Trigger 326. The Reference Signal generator consists of the high frequency clock 334 and the frequency dividers 336 and 338. The coincidence circuitry consists of one-shot multivibrators 327, 332 and 340 and NAND gates 342 and 344. The resynchronizing circuit consists of the presettable counter 364, inverters 366 and 368, NAND gates 362 and 372, and the preset one-shot 370. The pulse width discriminator 352.

Information signals from the transmitter in FIG. 12 are received on line 315. When this line is in the form of a power line, coupling transformer 321 and tuning network 323 are used for the same purposes as transformer 317 and network 316 in FIG. 12. The received input signals are fed to pulse shaping circuits 320, 322, 324, and 326. The output of trigger 326 consists of square waves at a frequency of $f_1$ or $f_2$. Frequency detection is based upon coincidence of these data pulses with locally generated pulse at a known reference frequency of $f_1$ or $f_2$. That is, an output from one of the detecting circuits is obtained from coincidence of pulse trains at a coincidence gate, where one pulse train is the received signal of unknown repetition frequency and the other pulse train is the locally generated signal with the reference frequency. In this detection scheme both pulse trains must have pulses of equal duration of pulse widths must be very short compared to the periods of the incoming data signals. This requirement is met by adjusting the coincidence one-shots 327, 340 and 332 to generate identical pulses of very short duration.

After synchronization of the incoming data pulses with the reference pulses, coincidence will be achieved in the coincidence gate connected to one of the reference frequencies if the data signal frequency is equal to that reference frequency. No coincidence will be achieved if these two frequencies are not equal. When coincidence is achieved in one of the coincidence gates, an output is generated by the pulse width discriminator fed from that gate, and no output is generated by the other discriminator.

Operation of the receiver circuitry will now be described in more detail with reference to FIG. 13. In the absence of input data pulses, the initial conditions in the circuit are as follows. Logic level of trigger 326 output is low, NAND gate 362 output is high, and pulse stretchers 350 and 354 outputs are low. Inputs to inverters 366 and 368 are low, thereby feeding one high input to NOR gate 337 and one high input to NOR gate 339. This causes these NOR gates to have logic low outputs. In addition, the high outputs from inverters 366 and 368 preclude a logic low at the output of NAND gate 372. Counter 364 is preset to a fixed state (not zero) by previous operation or by a specially generated preset signal at power turn-on. The two outputs from counter 364 coupled to NAND gate 362 are logic high when the counter is preset.

The two reference frequencies $f_1$ and $f_2$ are obtained from frequency dividers 336 and 338. These dividers are driven by a common high frequency clock oscillator 334. The frequency dividers are resynchronized with the incoming signal pulses at regular intervals in order to maintain synchronization regardless of any small differences in signal and reference frequencies. Counter 364 establishes the times at which resynchronization takes place. Initial synchronization is achieved when the first incoming data signal changes the output of trigger 326 from logic low to logic high and then back to logic low. This produces a logic low pulse at the output of NAND gate 362 which resets counter 364 and the frequency dividers 336 and 338. At the end of the first data pulse, this reset condition is removed, allowing the counter and the frequency dividers to resume operation, and the reference frequencies are synchronized with the data signal to within plus or minus one half cycle of the high frequency clock 334.

The coincidence of the first data pulse and reference pulses in coincidence gates 342 and 344 results in an outputs from one-shots 346 and 348 respectively. These one-shots have a period of approximately 75 percent of that of the corresponding reference frequency. That is, the period of the one-shot triggered by coincidence of $f_1$ pulses is 75 percent of the period $1/f_1$. The period of the one-shot triggered by coincidence of $f_2$ pulses is 75 percent of the period $1/f_2$. The one-shot outputs are stretched by approximately 50 percent by pulse stretchers 350 and 354. The pulse stretcher outputs are fed to the inputs of pulse width discriminators 352 and 356. Each discriminator has a time constant set for several successive periods of its reference pulse frequency; therefore several successive pulse stretcher outputs are necessary to produce a final discriminator output. This will result only when the incoming data pulse frequency is equal to the reference pulse frequency appearing at the coincidence gate. For example, if an incoming data signal produces an initial output from coincidence gate 342 followed by a pulse train with exactly the same frequency as the reference pulses fed from one-shot 322, then one-shot 346 will be retriggered at the required times to produce the necessary wide input pulse to discriminator 352, and a single output pulse is generated by discriminator 352. Furthermore, this same input signal will produce a single output from coincidence gate 344, but no pulse train will follow because the reference pulses at this gate have a different frequency. Consequently one-shot 348 will not be retriggered to produce the required wide input to discriminator 356, and no output is generated by this discriminator. In this same manner, this detection scheme discriminates against received pulse trains of any unwanted frequency as well as single spurious noise pulses which may produce a single coincidence output at one of the coincidence gates.

Following the initial pulse of a received data signal, counter 364 continues to receive input pulses from trigger 326. When the counter reaches its preset state, NAND gate 362 feeds a logic low reset pulse to the counter and to the frequency dividers 336 and 338, thereby resynchronizing the reference pulses with the incoming data pulses. In this manner, the reference pulses are resynchronized at every $n^{th}$ data pulse, where n is equal to the preset count of counter 364. The preset count is determined by which counter stage outputs are connected to NAND gate 362.

The resynchronization process just described presents a problem. Each input pulse which is used to reset the frequency dividers is lost. Therefore, were it not for the means to be described, each time the frequency dividers were resynchronized, there would be a loss of coincidence, causing the pulse width discriminator to fall to zero. This problem is overcome in the following manner.

When coincidence is achieved in either the channel corresponding to $f_1$ frequency signals or the channel corresponding to $f_2$ frequency signals, the output of inverter 366 or 368 will go to a logic low. The low signal is applied to either NOR gate 337 or 339, depending on which of the channels sees coincidence. When a reset pulse is subsequently generated, causing line 361 to go to a logic low, the output of the NOR gate 337, 339 corresponding to the channel which sees coincidence goes to a logic high. At the end of the reset pulse the particular gate returns to its logic low state.

The pulse thus generated passes through OR gate 341 or 343 and is applied to the one-shot 340 or 332 as the case may be. This pulse causes the firing of the one shot to produce an output pulse which arrives at the gate 342 or 344 in coincidence with the output from one shot 327. In this manner, loss of coincidence is prevented. The cycle just described continually repeats itself until the input pulse disappears, at which time coincidence is lost causing the disappearance of an output signal from the pulse width discriminator 352 or 356.

When the output from pulse stretchers 354 and 350 attain a logic low, the output of NAND gate 372 attains a logic low. The falling edge of the output of NAND gate 372 triggers one-shot 370 which generates an output pulse which presets counter 364 to its preset count.

Figure 14:
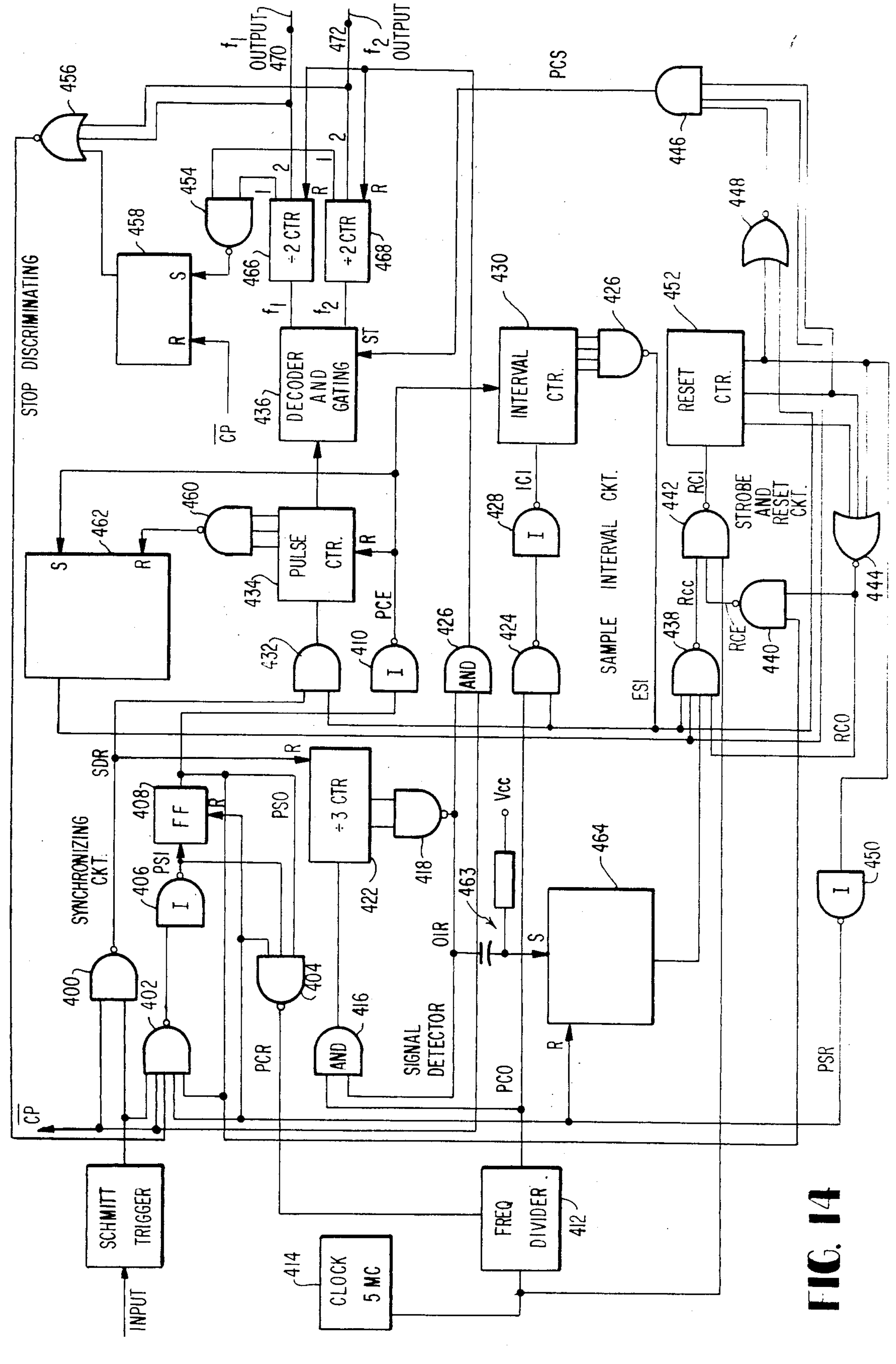
FIG. 14 illustrates a second embodiment of the receiver for use with this invention.

FIG. 14 illustrates the second embodiment of the receiver circuitry which may be used with the communication system of this invention. As with the first receiver, this receiver must determine and distinguish the two carrier frequencies in the incoming signal. This receiver distinguishes the $f_1$ signals from the $f_2$ signals on the basis of decoding and determining the number of pulses of an unknown frequency which is received during the time it takes to receive a fixed number of pulses of a reference frequency. Thus the reference frequency is used to establish an accurate time interval. By counting the number of incoming pulses over this time interval, the frequency of the incoming pulses can be determined. For optimum speed as well as for economical reasons the reference frequency should be of comparable magnitude with the unknown frequencies.

Direct readout of the pulse count in multiples of a base frequency unit is possible. For example, if the reference frequency is 100 KHz and a reference interval is defined as the time in which 100 counts of the reference frequency is recorded, then the number of counts accumulated in a register during this interval is equivalent to the unknown frequency in KHz.

The receiver circuitry is comprised of the following major functional components: The input pulse shaping circuit, the signal synchronizing circuit, the signal detector circuit, the reference frequency source, the sample interval circuit, the pulse counting and decoding circuit, the strobe and reset circuit, the error detecting circuits and the output circuit. The input pulse shaping circuit is identical to the one described under the first embodiment and shown in FIG. 13. The signal synchronizing circuits consist of gates 402 and 404, inverters 406 and 410 and flip-flop 408. The signal detector circuit consists of gates 400, 416, 418 and 420 and counter 422. The reference frequency source consists of clock 414 and frequency divider 412. The sample interval circuit consists of gates 424 and 426, inverter 428 and counter 430. The pulse counting and decoding circuit consists of gate 432, decoder/output gating 436 and counter 434. The strobe and reset circuit consists of gates 438, 440, 442, 444, 446 and 448, inverter 450 and counter 452. The error detecting circuits consist of gates 454, 456, and 460, and latches 458, 462 and 464. The output circuit consists of counters 466 and 468.

Figure 15:
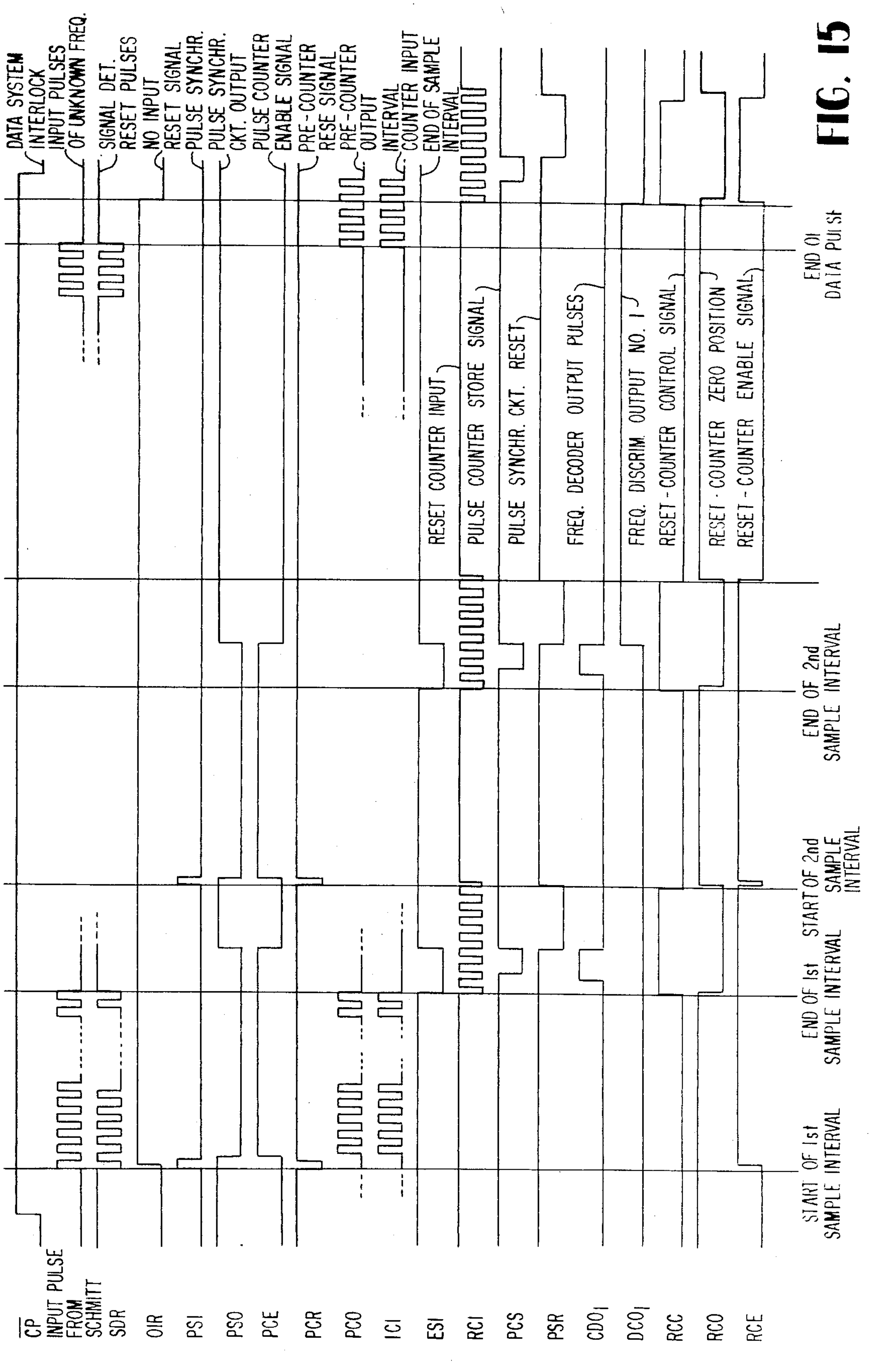
FIG. 15 illustrates the timing diagram associated with the receiver circuit of FIG. 14.

The operation of the receiver will now be described in detail with reference to FIGS. 14 and 15. FIG. 15 is a timing diagram associated with the circuitry sown in FIG. 14. Initially the input line is at a logic zero; flip-flop 408 is reset (PSO high); counters 430 and 434 are being held reset by a logic zero on line PCE; counter 422 is in state "3", i.e. line OIR is at a logic zero which holds counters 466 and 468 reset; counter 452 is in state "zero"; latches 458, 462 and 464 are reset; clock 414 and frequency divider 412 are constantly running; and both outputs are low. The first pulse in a series of incoming pulses changes the outputs of gates 400 and 402 from high to low. This resets counter 422 of the signal detector circuit and removes the reset condition from counters 466 and 468. The output of inverter 406 goes from low to high causing the output of gate 404 to go low thereby resetting the frequency divider 412. At the fall of the first input pulse the output of gate 402 goes high again causing the output of inverter 406 to go low thereby setting flip-flop 408. The output of flip-flop 408 is fed back to gate 402 which keeps the output of this gate at a logic high thereby preventing any further pulses from reaching the inverter 406 or the flip-flop 408. The setting of flip-flop 408 causes line PSO to attain a logic high, thereby removing the reset condition from frequency divider 412. Thus the first incoming pulse resets frequency divider 412 and sets flip-flop 408 and the reference frequency generated by frequency divider 412 (PCO) is now synchronized to the incoming pulses to within less than ± one 5Mc clock period.

The setting of flip-flop 408 also changed the output of inverter 410 (line PCE) from low to high. With PCE high both the pulse counter 434 and the interval counter 430 are enabled. That is they are now able to start accumulating a pulse count. The first input pulse was utilized to reset the frequency divider 412 and remove the reset condition from pulse counter 434 and interval counter 430; succeeding input pulses now pass through gates 400 and 432 and increment the pulse counter 434.

At the same time output pulses of frequency divider 412 pass through gate 424 and inverter 428 and increment the interval counter 430. When a predetermined number of pulses have been received by the interval counter, thereby defining the sample interval, the output of gate 426 goes to a logic low, blocking gates 424 and 432. No further pulses can now reach the input of either counter and increment its pulse count. Since the operation of both counters started simultaneously and since the reference frequency (line PCO) was synchronized to the input pulses the pulse count in counter 434 represents input pulses during the sample interval.

The objective of the receiver is now to decode the pulse count accumulated in counter 434 and to convert it to an appropriate output. To do this the pulse count is applied to the decoder and output gating at the proper time. If the pulse count decodes into one of the signal frequencies as determined by the output gating, then an output for $f_1$ or $f_2$ will appear on the decoder and increment the respective output counter 466 or 468. The reason for the output counters 466 and 468 is to guard against erroneous decoding and receiver malfunction by requiring a repetition of the complete frequency discrimination cycle before a final output will appear at counter 466 or 468. Naturally this could be repeated more than once by changing to a different divisor. If the first discrimination resulted in an output for $f_1$ (i.e., counter 466 in state "1"), and if the following discrimination during the same data cycle resulted in an output for $f_2$ (i.e., counter 466 and 468 both in state "1"), then a malfunction or invalid input condition exists, the output of gate 454 goes low and sets latch 458 which disables the entire receiver until the enable/reset signal $\overline{CP}$ goes low. Thus the erroneous signal cycle is eliminated resulting in a loss of a data bit which can be detected by conventional parity check circuits as well as fixed-bit word lengths. In other words, during the same data cycle the same frequency has to be discriminated twice before the particular output counter is advanced to state "2" thereby generating a valid data output signal; otherwise no output is generated at all.

The bandwidth or frequency tolerance of the receiver can be easily set by arranging the decoder output gating such that a group of adjacent pulse counts will be decoded into a particular frequency. For instance, if carrier frequency $f_1$ is nominally 100 Kc and the sample interval is 1 millisecond, the output gating might be arranged such that a pulse count of 98 or 99 or 100 or 101 or 102 would yield an output.

The strobe and reset circuitry assures proper timing and operation of the receiver. At the end of the sample interval the output of gate 426 (line ESI) went low which blocked gates 424 and 432. Line ESI going low causes the output of gate 438 to go high, removing the disable condition at gate 442 which now applies high speed pulses of clock 414 to the input of the reset counter 452. Originally, counter 452 was in state "0" and the output of gate 444 was high. The first input pulse changes the state of counter 452 from "0" to "1" which changes the output of gate 444 from high to low insuring that gates 438 and 444 have a high output, thereby keeping gate 442 enabled, i.e., clock pulses continue to increment counter 452.

When counter 452 reaches state "2" the output of gate 446 goes high, activating the strobe signal input of the decoder which applies the outputs of the pulse counter 434 to the decoder output gating thereby generating an output if the stored pulse count information matches one of the gate combinations. This strobe signal remains active until counter 452 reaches state "4" at which time the output of gate 448 goes low, disabling gate 446. When counter 452 is in state "4" the output of inverter 450 (line PSR) goes low which resets the synchronizing circuit (i.e., flip-flop 408). The reset condition on line PSR remains until the end of the strobe/reset cycle, i.e., until counter 452 reaches state "0" again. At that time the output of gate 444 goes high again and since flip-flop 408 has been reset in the meantime, (line PSO high), the output of gate 440 goes low, disabling gate 442 and thereby terminating the reset cycle. The next incoming pulse now starts the entire discrimination cycle over again by resetting the frequency divider 412, setting flip-flop 408, etc.

The end of a data-bit input cycle is detected by the signal detector. The first input pulse of a discrimination cycle reset counter 422 which was initially in state "3." Resetting the counter caused the output of gate 418—line OIR—to go from low to high which removed the reset condition to the output counters 466 and 468. Line OIR going high enables gate 416 which now applies reference frequency pulses—line PCO—to the input of counter 422. However, the incoming input pulses—line SDR—constantly reset counter 422 to zero which cannot therefore accumulate a pulse count as long as input pulses are received. When no input pulses are received any longer, after a data-bit reception, counter 422 will start accumulating a pulse count. As soon as the counter reaches state "3" the output of gate 418—line OIR—goes low which disables gate 416 thereby latching up the state "3" of the counter. Line OIR going low resets the output counters 466 and 468, thereby removing the output signal and also sets latch 464 by means of the pulse coupling network 463. The setting of latch 464 triggers the strobe/reset cycle previously described to insure that the receiver circuitry is properly reset and ready for the next data-bit cycle reception. The receiver circuit is now in its quiescent state until a new data-bit cycle is received, resetting counter 422 and triggering the synchronizing circuit as previously described.

The strobe/reset cycle can also be triggered by the setting of latch 462 which would happen if a pulse count higher than the greatest allowed frequency is accumulated by pulse counter 434, indicating a possible malfunction of the input bandpass filters or random noise pick up. Triggering of the strobe/reset cycle by either latch 462 or 464 however does not generate the strobe signal PCS since in either case the output of gate 448 is low, disabling gate 446.

The transmitter and receivers described in the foregoing thus convert digital input data into a succession of frequency modulated pulses, one frequency representing a logic ZERO or low, and the other frequency representing a logic ONE or high. The receiver outputs are independent pulses for logic ZERO and logic ONE which can be reconverted to a single line output by means of a latch. The separate transmission and discrimination of logic ONEs and ZEROs, however, together with the ability to accurately determine the occurrence and position of an error give the system the characteristics and performance of a "Binary Erasure Channel" system, making possible reliabilities and efficiencies heretofore not attainable by the conventional "Binary Symmetric Channel."

The simplest way to achieve ultimate reliability is to use fixed length words with even parity and to count the number of bits received, comparing this count against the word length, and checking for parity of one of the two frequencies.

While the invention has been particularly shown and described with reference to a preferred embodiment thereof, it will be understood by those skilled in the art that various changes in form and details may be made therein without departing from the spirit and scope of the invention.

What is claimed is:

1. A communication system comprising;

a plurality of message stations arranged in groups;

a pyramid structured interconnecting network coupling each of said message stations to all other message stations;

said interconnecting network comprising a plurality of control stations arranged in groups, each group of control stations being connected to a single higher level control station in the pyramid structure, each group of message stations being coupled to a control station.

2. The system of claim 1 wherein said message stations form the base level of said pyramid structured interconnecting network, each control station at the base plus one level being coupled to at least one message station.

3. The system of claim 1 wherein each control station includes first receiver means for receiving messages from lower level stations, transmitting means for transmitting said received messages to higher level control stations, second receiver means for receiving messages from the same and higher level control stations, and transmitter means for transmitting messages to lower level control stations whereby a message travels from the sending stations through the control stations of the pyramid structured interconnecting system to a destination message station.

4. The system of claim 3 wherein each of said control stations further includes interrogation means for interrogating each of the lower level stations directly coupled to said each control station, each message and control station includes receiver means for receiving interrogation signals, each identifying one of said stations, from the higher level control station to which it is directly coupled, and means responsive to the interrogation signals for causing said station to transmit messages.

5. The system of claim 4 wherein each control station further includes first storage means for storing messages received from lower level stations and second storage means for storing messages received from higher level stations, and gate control means for causing said control stations to selectively operate in an interrogation mode or a transmitting mode.

6. A pyramid structured communication system comprising, a plurality of message stations, K levels of control stations, K−1 levels containing a plurality of control stations the Kth level containing a single station only, single channel transmission lines interconnecting said levels, each control station being coupled by way of said lines to a plurality of stations at the next lower level, whereby each message station is coupled to every other message station in said communication system through said control stations and single channel lines.

7. The system of claim 6 wherein each control station includes, first receiver means and first transmitter means for transferring messages from lower level stations to higher level stations, and second receiver means and second transmitter means for transferring messages from higher level stations to lower level stations.

8. The system of claim 7 wherein each control station includes interrogation means for simultaneously interrogating each of the lower level stations directly coupled to said interrogating control station, each interrogating signal identifying only one of said lower level stations, each of the message and control stations including interrogation receiver means for receiving all interrogating signals from the higher level station to which it is coupled and means, responsive to said one interrogating signal identifying the station, for causing said station to transmit messages to said direct coupled higher level station.

9. The system of claim 8 wherein said interrogating signals are unique addresses and said means responsive to interrogating signals comprise first authenticating means including, an authenticating register for receiving said interrogating signals, unique address store means storing the unique address identifying the station, comparator means for comparing the received interrogating signal with the stored unique address and first gate means responsive to an indication by the comparator means that said received interrogating signal is equivalent to the stored address for permitting the transmission of messages from said station to the higher level stations.

10. The system of claim 9 wherein each control station includes first storage means for storing messages received from lower level stations, and second storage means for storing messages received from higher level stations, said first gate means selectively blocking the flow of messages between the first storage means and said first transmitter means.

11. The system of claim 10 wherein each of said control stations includes gate control means for controlling transmission and reception of messages from lower level stations.

12. The system of claim 11 wherein said first and second storage means comprise, first register means for receiving messages, each message comprising a plurality of characters, means for producing a signal in response to receiving each character, means, responsive to said signal from said means for producing, for counting the number of received characters, means responsive to a predetermined count in said counting means for producing a full signal, and means responsive to coincidence between a full signal and a signal indicating that a complete message has been received for indicating to said gate control means that the station should switch from an interrogation mode of operation to a transmitting mode, and said gate control means including means responsive to said indicating signal from said coincidence responsive means for switching the control station from an interrogation mode to a transmitting mode.

13. The system of claim 10 wherein each message includes a destination address, each control station includes a second authenticating means, responsive to the destination address in the messages from lower level stations, for determining if the message is directed to a message station also under the control of said receiving control station and gate means, responsive to said second authenticating means for selectively permitting said received messages to enter said first storage means only if the message is directed to a message station not under the control of said receiving control station.

14. The system of claim 13 wherein each of said control stations further includes third authenticating means responsive to the destination address in messages received from higher level control stations for determining if the received message is directed to a message station under its control and gate means responsive to said third authenticating means for permitting received messages from higher level stations to enter said second storage means only if directed to a message station under its control.

15. The system of claim 14 wherein the destination address portion of each message comprises K subaddresses, each subaddress being associated associated with one level of the pyramid structured system except the apex level, each subaddress further identifying one station at each level, each station being uniquely defined by the addresses of the stations defining the shortest path from the station to the apex station, said second and third authenticating means including, a serial shift register for receiving the destination address in each message, storage means for storing a unique address of the control station, and comparator means for comparing the stored unique address with the received address.

16. The system of claim 15 wherein said second authenticating means further includes, means responsive to the comparator means for disabling said gate when said stored unique address corresponds to the received destination address.

17. The system of claim 16 wherein said single channel transmission lines comprise power lines.

18. The system of claim 17 further including wireless bypasses for transmitting communication signals across power transformers and switch gear.

19. The system of claim 18 further including in-line communication signal amplifiers.

20. The system of claim 19 wherein said wireless bypass comprises, first clamp-on current transformer means for receiving power line carried communication signals, amplifier means for amplifying the received communication signals, wireless transceiver means for transferring said communication signals across said power transformers and switch gear and second clamp-on current transformer means for coupling said transferred signal back to the power line.

* * * * *